(12) United States Patent
Wei et al.

(10) Patent No.: US 9,999,852 B2
(45) Date of Patent: Jun. 19, 2018

(54) METHOD FOR REMOVING $SO_x$ FROM GAS WITH COMPOUND ALCOHOL-AMINE SOLUTION

(71) Applicants: BEIJING BOYUAN HENGSHENG HIGH-TECHNOLOGY CO., LTD, Beijing (CN); YONGFENG BOYUAN INDUSTRY CO. LTD., Ji'an, Jiangxi (CN); PEKING UNIVERSITY, Beijing (CN)

(72) Inventors: Xionghui Wei, Beijing (CN); Meihua Zou, Beijing (CN); Shaoyang Sun, Beijing (CN); Yong Sun, Beijing (CN); Jiaxu Liu, Beijing (CN); Jun Wang, Beijing (CN); Jianbai Xiao, Beijing (CN); Lifang Li, Jiangxi (CN); Li Chen, Jiangxi (CN); Chun Hu, Beijing (CN); Xiangbin Li, Jiangxi (CN); Mingjin Wan, Jiangxi (CN)

(73) Assignees: BEIJING BOYUAN HENGSHENG HIGH-TECHNOLOGY CO., LTD, Beijing (CN); YONGFENG BOYUAN INDUSTRY CO. LTD., JIANGXI PROVINCE, Ji'an, Jiangxi (CN); PEKING UNIVERSITY, Beijing (CN)

( * ) Notice: Subject to any disclaimer, the term of this patent is extended or adjusted under 35 U.S.C. 154(b) by 131 days.

(21) Appl. No.: 15/028,260

(22) PCT Filed: Oct. 13, 2014

(86) PCT No.: PCT/CN2014/088463
§ 371 (c)(1),
(2) Date: Apr. 8, 2016

(87) PCT Pub. No.: WO2015/055104
PCT Pub. Date: Apr. 23, 2015

(65) Prior Publication Data
US 2016/0243491 A1    Aug. 25, 2016

(30) Foreign Application Priority Data

Oct. 15, 2013 (CN) .......................... 2013 1 0481557

(51) Int. Cl.
*B01D 53/14* (2006.01)
(52) U.S. Cl.
CPC ..... *B01D 53/1425* (2013.01); *B01D 53/1481* (2013.01); *B01D 53/1493* (2013.01);
(Continued)
(58) Field of Classification Search
CPC ............ B01D 53/1425; B01D 53/1481; B01D 53/1493; B01D 2252/2026; B01D 2252/20478; B01D 2258/0283
(Continued)

(56) References Cited

U.S. PATENT DOCUMENTS

| 3,658,462 A | 4/1972 | Van Scoy |
| 4,368,178 A | 1/1983 | Diaz |

(Continued)

FOREIGN PATENT DOCUMENTS

| CN | 1087110 A | 5/1994 |
| CN | 1133817 A | 10/1996 |

(Continued)

OTHER PUBLICATIONS

Bin Ma, "Development of Amisol Process", Coal Chemical Industry, 1994, vol. 3, pp. 35-38.
(Continued)

*Primary Examiner* — Frank Lawrence
(74) *Attorney, Agent, or Firm* — Novick, Kim & Lee, PLLC; Allen Xue

(57) ABSTRACT

A method for removing $SO_x$ from a gas by using a compound alcohol-amine solution is provided. The compound alcohol-amine solution is made by mixing ethylene glycol and/or
(Continued)

polyethylene glycol with hydroxyl and/or carboxyl organic compound having basic group containing nitrogen. The compound alcohol-amine solution is contacted with the gas containing $SO_x$ to absorb the $SO_x$ in the gas, wherein x=2 and/or 3. The compound alcohol-amine solution with absorbed $SO_x$ is regenerated by one or more of heating method, vacuum method, gas stripping method, ultrasonic method, microwave method, and radiation method to release by-products of sulfur dioxide and sulfur trioxide, and the regenerated compound alcohol-amine solution is recycled for use. This method can be used for removing $SO_x$ from flue gas, burning gas, coke-oven gas, synthesis waste gas from dyestuff plants, sewage gas from chemical fiber plants, and other industrial raw material gases or waste gases containing $SO_x$.

17 Claims, 7 Drawing Sheets

(52) U.S. Cl.
CPC ............... *B01D 2252/2026* (2013.01); *B01D 2252/20478* (2013.01); *B01D 2252/20494* (2013.01); *B01D 2258/0283* (2013.01); *Y02A 50/2348* (2018.01)

(58) Field of Classification Search
USPC .......... 95/187, 235; 423/242.1, 242.2, 242.3, 423/242.7
See application file for complete search history.

(56) References Cited

U.S. PATENT DOCUMENTS

| | | | |
|---|---|---|---|
| 2006/0104877 A1* | 5/2006 | Cadours | B01D 53/48 423/226 |
| 2007/0148068 A1* | 6/2007 | Burgers | B01D 53/1425 423/220 |
| 2007/0264180 A1 | 11/2007 | Carrette et al. | |
| 2008/0056971 A1 | 3/2008 | Hughes | |
| 2009/0263302 A1* | 10/2009 | Hu | B01D 53/1425 423/228 |
| 2011/0052458 A1 | 3/2011 | Hu | |
| 2011/0315014 A1* | 12/2011 | Wei | B01D 53/1425 95/173 |
| 2012/0321538 A1 | 12/2012 | Hu | |

FOREIGN PATENT DOCUMENTS

| | | |
|---|---|---|
| CN | 1227135 A | 9/1999 |
| CN | 1349427 A | 5/2002 |
| CN | 1398659 A | 2/2003 |
| CN | 101053746 A | 10/2007 |
| CN | 101502741 A | 8/2009 |
| CN | 102612402 A | 7/2012 |
| CN | 103221114 A | 7/2013 |
| CN | 105148694 A | 12/2015 |
| DE | 2333708 A1 | 1/1975 |
| FR | 2532190 A1 | 3/1984 |
| JP | S49-072196 A | 7/1974 |
| JP | S49-109287 A | 10/1974 |
| JP | S62-95118 A | 5/1987 |
| JP | S62-110733 A | 5/1987 |
| JP | H03-154611 A | 7/1991 |
| JP | H06-228573 A | 8/1994 |
| JP | 2006136885 A | 6/2006 |
| JP | 2008056971 A | 3/2008 |
| JP | 2009537302 A | 10/2009 |
| JP | 2012517890 A | 8/2012 |
| JP | P2012-525253 A | 10/2012 |
| JP | 2013188649 A | 9/2013 |
| RU | 2070423 C1 | 12/1996 |
| SU | 655410 A1 | 4/1979 |
| SU | 927282 A1 | 5/1982 |
| SU | 1611411 A1 | 12/1990 |
| WO | 198400952 A1 | 3/1984 |
| WO | 190007467 A1 | 7/1990 |
| WO | 2003011432 A1 | 2/2003 |

OTHER PUBLICATIONS

Wenbin Dai et al, "Solubilities of Gases in Rectisol Process", Computer and Applied Chemistry, vol. 11, No. 1, Feb. 1994, pp. 44-51.

Xionghui Wei et al., "Desulfurization of Gases with a Buffering Solution of Basic Ironic Salts", Journal of Chemical Industry and Engineering, vol. 49, No. 1, Feb. 1998, pp. 48-58.

European Patent Office, "Extended European Search Report", dated May 12, 2017.

* cited by examiner

METHOD FOR REMOVING SO$_x$ FROM GAS WITH COMPOUND ALCOHOL-AMINE SOLUTION

TECHNICAL FIELD

This invention relates to a purification method of flue gas, waste gas containing sulfur, and/or industrial raw material gas, in particular to a method for removing SO$_x$ (x=2 and/or 3) from flue gas, waste gas containing SO$_x$, and/or industrial raw material gas.

BACKGROUND

The consumption and discharge of the flue gas, industrial raw material gas containing sulfur and other waste gases are increasing day by day due to the rapid development of industries. Discharge of waste gas containing sulfur has caused serious environmental pollutions, such as the formation of acid rain, acid corrosion of construction, respiratory diseases and skin diseases, etc., which are directly harmful to human health. Over years, scientific and technological researchers in various countries have intensively studied the desulfurization process of the flue gas, industrial raw material gas containing sulfur and other waste gases and accumulated a lot of research data. The desulfurization of the flue gas, industrial raw material gas containing sulfur and other waste gases has increasingly received much attention with the increased environmental awareness. However, so far we have not made breakthrough progresses in the desulfurization techniques of the flue gas, industrial raw material gas containing sulfur and other waste gases. The desulfurization of the flue gas, industrial raw material gas containing sulfur and other waste gases is still a challenging problem.

The existing desulfurization processes of the flue gas, industrial raw material gas containing sulfur and other waste gases mainly include wet desulfurization and dry desulfurization. The wet desulfurization includes water washing method, limestone and limewater method, alkali metal solution method, alkaline solution method, ammonia method and alcohol amine method. The dry desulfurization includes iron oxide method, zinc oxide method, manganese oxide method, cobalt oxide method, chromium oxide method, molybdenum oxide method, and activated carbon method. The water washing method, limestone and limewater method are used in China. The limestone and limewater method, alkali metal solution method, alkaline solution method, ammonia method and alcohol amine method are widely used in developed countries. The water washing method has the disadvantages that a great deal of water is consumed, the used water cannot be recycled, serious secondary pollution has been caused by the discharge of waste water containing sulfur and the desulfurization effect is poor. The limestone and limewater method is better than the water washing method. However, the limestone and limewater method has the disadvantages that more solid wastes such as calcium sulfate, calcium sulfite and calcium carbonate are generated, a great deal of limestone and calcium oxide are consumed, the equipment is huge, the investment is large, and the equipment is inclined to be clogged due to the generated solid precipitates during the absorbing process. Further, calcium hydroxide is preferentially reacted with carbon dioxide during the absorbing process due to the limestone and calcium hydroxide having small solubilities in water, and then with sulfur oxides, the desulfurization effect of limewater method is not desirable. In addition, the limewater method has the disadvantages of more sewage discharge and serious secondary pollution. The alkali metal solution method, alkaline solution method, ammonia method and alcohol amine method are mainly used for the desulfurization of flue gas with relatively high content of sulfur dioxide (tail gases of smelting such as steel smelting and copper smelting, in which the sulfur dioxide content can be up to 8% or more), and the removed sulfur dioxide is recovered. These methods are not suitable for the desulfurization of normal flue gas due to the relatively high requirements for the techniques, relatively high energy consumption and high demand for material of the equipment. Meanwhile, corrosion to the equipment is dramatically serious for all the currently used desulfurization processes of the flue gas, industrial raw material gas containing sulfur and other waste gases.

So far, various gases are seldom subjected to desulfurization treatment before being discharged into atmosphere. The gases still have relatively high content of sulfur even if they are subjected to desulfurization treatment. The existing desulfurization methods such as HiPure method, Benfield method, G-V method, A.D.A method, water washing method, limestone and limewater method, alkali metal solution method, alkaline solution method, ammonia method, alcohol amine method, tannin extract method, and sulfolane method, as well as the dry desulfurization methods such as iron oxide method, zinc oxide method, manganese oxide method, cobalt oxide method, chromium oxide method, molybdenum oxide method, and activated carbon method are mainly used as primary desulfurization methods for removing hydrogen sulfide from industrial raw material gases, but are not commonly used for removing hydrogen sulfide from general gases. The main reasons for this are that these desulfurization methods have low desulfurization efficiency, high operating costs, high equipment investments, serious corrosion to equipment, undesirable desulfurization effects, and poor removal rate for organic sulfur[1-3]. The desulfurization technique by low-temperature methanol[4] is a method of physically adsorbing hydrogen sulfide, carbonyl sulfur, carbon disulfide and carbon dioxide and is commonly used for decarbonization and desulfurization of raw material gases in modern large-scale chemical enterprise. However, since methanol has low boiling point, is volatile, and has high saturated vapor pressure, it is usually required to operate under high pressure and at low temperature (less than −10° C.) and thus the energy consumption is high, methanol loss is serious, the process is complicated, the operation is tedious, and the comprehensive operating expense is high. The normal-temperature methanol method [5] is a method of absorbing hydrogen sulfide, carbonyl sulfur, carbon disulfide and carbon dioxide in gas by a mixed solution of 60% methanol and 40% diethanolamine and then releasing hydrogen sulfide, carbonyl sulfur, carbon disulfide and carbon dioxide by heating and reducing pressure. However, since methanol has low boiling point, is volatile, and has high saturated vapor pressure, the released gas contains a great deal of methanol, thereby resulting in variable solution composition and serious methanol loss. In addition, the chemical stability of the solution is poor for the reasons that the diethanolamine is prone to oxidative decomposition after being exposed to daylight and air. Therefore, after the hydrogen sulfide, carbonyl sulfur, carbon disulfide and carbon dioxide are regenerated and released by heating and reducing pressure when adopting solution regenerating method, Claus method may have to be used to convert the released gases containing sulfur into sulfur. This leads to high energy consumption, serious loss of methanol and diethanolamine, complicated process, tedious operation, and high comprehensive operating expense. The methods described above are mainly used for removing organic sulfur such as hydrogen sulfide, carbonyl sulfur, and carbon disulfide in gas, but not used for removing $SO_2$ and/or $SO_3$ in gas.

A urotropine aqueous solution containing glycerol (glycerin) is proposed to absorb $SO_2$ in flue gas[6]. However, it is found that urotropine tends to be oxidative decomposed by oxygen gas present in the flue gas after contacting with it in practical experiment, causing the chemical property of the solution to be unstable. In addition, urotropine as a product of chemical and medical is expensive and is not readily available. Therefore, this method fails to be widely used due to high operating costs and unstable desulfurization performance.

A buffer solution of acetic acid and ammonia containing $Fe^{2+}$ and $Fe^{3+}$[7-9] has been used for desulfurization of semi-water gas, which has relatively high desulfurization efficiency and relatively low corrosion. However, the solution is unstable due to ionic effect and salt effect. In the method of iron-alkaline solution catalyzed decarbonization, desulfurization, and decyanation from gas, an aqueous solution of alkaline substance containing iron ions is used for absorbing the sulfur in the gas. This method can be used for removing various types of sulfur and has better desulfurization effect than the conventional wet desulfurization method for the gas having low sulfur content. However, the iron ions are unstable in the alkaline solution and a large amount of precipitate of ferric hydroxide or ferrous hydroxide will be produced. Simultaneously, a large amount of precipitate of ferric sulfide or ferrous sulfide will be produced when the iron-alkaline solution is contacted with gas containing sulfide. Thus the content of iron ions in the solution decreases rapidly and the desulfurization effect significantly reduces. In addition, the phenomenon of clogging the desulfurization tower will occur. Therefore, this method is not suitable for the desulfurization of gas having high sulfur content[10]. In order to improve this situation, we attempt to carry out the desulfurization by "iron-alkaline solution" containing microorganisms under normal pressure or increased pressure and a good desulfurization effect is achieved[11]. Furthermore, it is suggested to absorb hydrogen sulfide by ethylene glycol, or ethylene glycol ester, or diethylene glycol monomethyl ether solution. Then, sulfur dioxide gas is blown into the organic solution with absorbed hydrogen sulfide, and hydrogen sulfide is reacted with sulfur dioxide to produce sulfur so as to allow the organic solution to be regenerated and recycled for use[12-14]. Although the method for regenerating the ethylene glycol solution containing hydrogen sulfide by sulfur dioxide is very simple, sulfur dioxide is limited in supply and is not readily available. In addition, it is required for special device and safety measure during transportation. Therefore, this method has disadvantages that the operating cost is high and the safety measure is strict. It is proposed to absorb hydrogen sulfide, organic sulfur and water in natural gas or other gases by ethylene glycol solution, or a mixed solution of ethylene glycol and alkanolamine, or a mixed solution of ethylene glycol, alkanolamine, and sodium carbonate, or ethylene glycol dimethyl ether or diethanol dimethyl ether solution, or a mixed aqueous solution of diethylamine, diethylene glycol, triethylene glycol and triethylene glycol methyl ether, or a mixed solution of amine and acetaldehyde, or a mixed aqueous solution of diethylene glycol monomethyl ether and ferric nitrilotriacetate[15-23]. However, currently these processes described above are only used in the desulfurization of industrial raw material gas in large scale to remove hydrogen sulfide, carbonyl sulfur, and carbon disulfide, but not used in the desulfurization of flue gas and other waste gases to remove $SO_x$ (including sulfur dioxide and/or sulfur trioxide).

Our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)" have good desulfurization effects during industrialized production tests. However, a small amount of the ethylene glycol and polyethylene glycol solutions will deteriorate during regeneration by heating, which will increase the operating costs and affect desulfurization efficiencies. It has been found that sulfur dioxide or sulfur trioxide mainly interacts with hydroxyl groups in the molecules of ethylene glycol or polyethylene glycol and simultaneously is weakly bound to ether linkage in polyethylene glycol when interacting with ethylene glycol or polyethylene glycol. The interacting mechanisms are as follows:

Taking ethylene glycol and diethylene glycol as examples only, the chemical reactions are as follows:

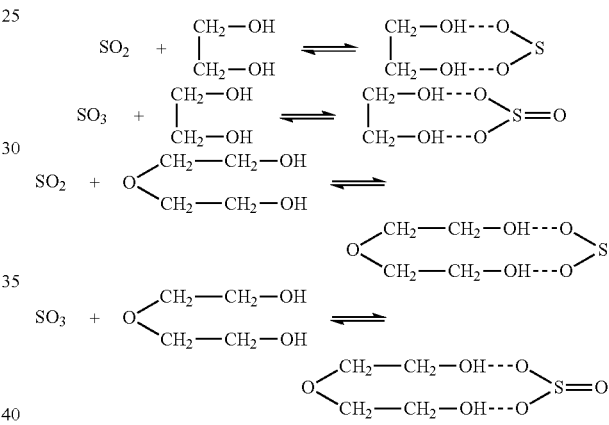

The following weak bindings will occur besides the above main reactions:

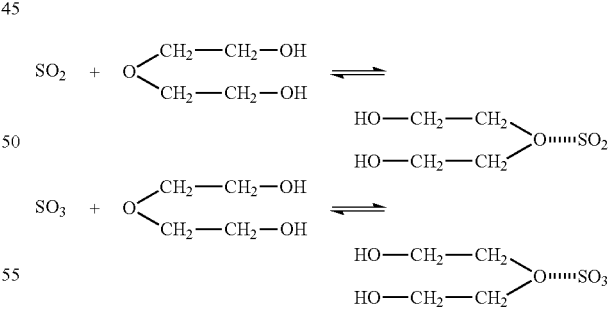

The following side reactions will occur during regeneration by heating:

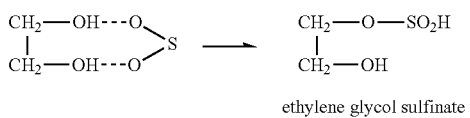

ethylene glycol sulfinate

-continued

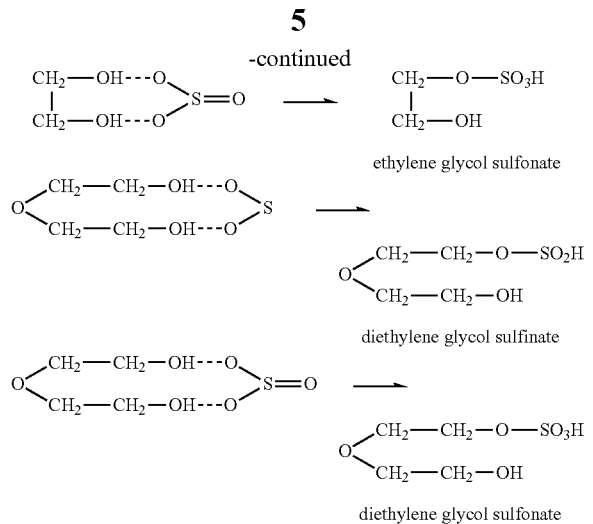

From our current research results, it can be seen that these side reactions may be irreversible reactions. That is to say, there is so far no way to reverse these side reactions. The resulting sulfinates and sulfonates cannot be regenerated to release sulfur dioxide or sulfur trioxide. The capability of the solution to absorb sulfur will decrease as the amount of sulfinates and sulfonates in the solution increases. The solution deteriorates, thereby damaging the system and even making the system unworkable.

REFERENCES

[1] Benson, H. E. Parrish, R. W. (1974) HiPure Process Removes $CO_2/H_2S$. Hydrocarbon Processing, April. 81-82.
[2] Jenett, E. (1962), Giammarco-Vetrocoke Process. The Oil and Gas Journal. April 30, 72-79.
[3] F. C. Riesenfeld, A. L. Kohl, translated by Yusheng Shen, <Gas Purification>, Beijing, China Architecture & Building Press, 1982.
[4] Wenbin Dai, Hongqing Tang, <Computer and Applied Chemistry>, 1994, 11 (1), P44-51.
[5] Bin Ma, <Coal Chemical Industry>, 1994, No. 68, P35-38.
[6] Zh. Prikl. Khim. (S.-Peterburg), 66(10), 2383-2385 (Russian), 1993.
[7] Xionghui Wei, Qianhuan Dai, Zhongming Chen, Kesheng Shao, Chending Zhang, (1998) Principle of Desulfurization by Buffer Aqueous Solution of Alkaline Iron Salt, Journal of Chemical Engineering, 49(1), 48-58.
[8] Xionghui Wei, (1994) Novel method of Desulfurization and Deoxygenation for Semi-water Gas, Chinese patent publication No. 1087110.
[9] Xionghui Wei, (1996) Decarbonization and Desulfurization Method by Pressurized Iron-alkaline Solution, Chinese patent publication No. 1133817.
[10] Xionghui Wei, Meihua Zou, Fenghui Wei, (1999) Decarbonization, Desulfurization and Decyanation Method for Gas by Iron-alkaline Solution via Catalysis, Chinese patent No. ZL99100596.1.
[11] Xionghui Wei, (2002) Desulfurization Method for Gas by Biochemical Iron-alkaline Solution via Catalysis, Chinese patent No. ZL02130605.2.
[12] Galeeva R. G., Kamalov Kh. S., Aminov M. Kh., Gafiatullin R. R., Mitina A. P., Bakhshijan D. Ts., Safin G. R., Levanov V. V., Installation for Complete purification of Petroleum and Nattural Gases, RU2070423C1.
[13] Biedermann, Jean-Michel, Process for Eliminating Hydrogen Sulphide Contained in Gas Mixture, PCT/FR83/00174.
[14] Biedermann, Jean-Michel, etc., Process for Eliminating Hydrogen Sulphide Contained in Gas Mixture, FR2532190-A1.
[15] Muraoka Hiromitsu, Dehydration Method by Ethylene Glycol, JP62-95118A.
[16] German Patent, Dehydration Method by Ethylene Glycol, DT2333708A1.
[17] The Former Soviet Union Patent, SU1611411A1.
[18] Komuro Takeyong, JP6-228573A.
[19] The Former Soviet Union Patent, SU655410A.
[20] WYSCHOF SKY Michael, HOBERG Dirk, Method for the Separation of Gaseous Components from Technical Gases by Means of Ethylene Glycol Dimethyl Ethers at Low Temperatures, WO03011432A1 (PCT/EP02/07915).
[21] The Former Soviet Union Patent, SU927282B.
[22] DILLON Edward Thomas, Composition and Method for Sweetening Hydrocarbons, WO9007467A1 (PCT/U589/05742).
[23] Zaida Diaz, Process for the Removal of $H_2S$ and $CO_2$ from Gaseous Streams, U.S. Pat. No. 4,368,178.

SUMMARY OF INVENTION

In order to address the deficiencies described above in our earlier patents of "Method for removing $SO_x$ from gas by polyethylene glycol (Patent No. ZL200910009058.1)" and "Method for removing $SO_x$ from flue gas by ethylene glycol (Patent No. ZL200710110446.X)", increase the desulfurization capacity, and avoid or significantly reduce the generation of sulfinates and sulfonates, the invention provides a method for removing $SO_x$ from flue gas by a compound alcohol-amine solution made by mixing ethylene glycol and/or polyethylene glycol with hydroxyl organic compound having basic group containing nitrogen and/or carboxyl organic compound having basic group containing nitrogen. After performing an extensive research, it has been found that the ethylene glycol and/or polyethylene glycol will interact with the hydroxyl organic compound having basic group containing nitrogen and/or carboxyl organic compound having basic group containing nitrogen to form a stable associate via hydrogen bonds, and thus the stability of the compound alcohol-amine solution is significantly enhanced, thereby remarkably increasing the acid and basic resistance of the compound alcohol-amine solution. Under the action of strong acid or strong base, or in the condition of thermal dehydration, the formed associated hydrogen bonds will partially dehydrate to form ether bonds or ester bonds. In this circumstance, the solution will be more stable.

For illustrating the mechanism of hydrogen bond association of the compound alcohol-amine solution according to the invention, ethylene glycol and ethanolamine, diethylene glycol and ethanolamine, ethylene glycol and triethanolamine, diethylene glycol and triethanolamine, ethylene glycol and EDTA disodium salt, as well as diethylene glycol and EDTA disodium salt are exemplified. However, it is not intended to limit that the compound alcohol-amine solution according to the invention only consists of ethylene glycol and/or diethylene glycol and ethanolamine and/or triethanolamine and/or EDTA disodium salt. Instead, the compound alcohol-amine solution according to the invention consists of ethylene glycol and/or polyethylene glycol and hydroxyl organic compound having basic group containing nitrogen and/or carboxylic acid organic compound having basic group containing nitrogen and/or carboxylate organic compound having basic group containing nitrogen.

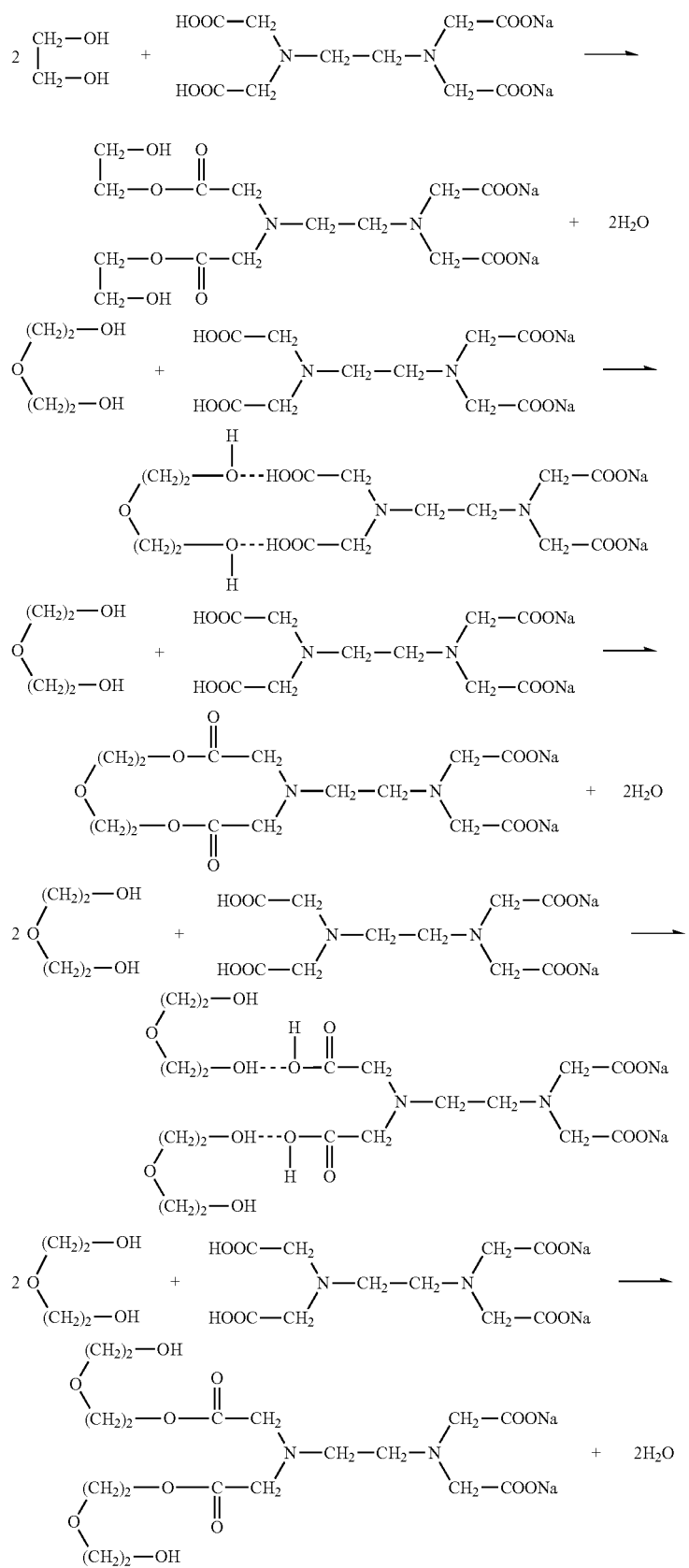

It is found by study that the solubility of EDTA (including various salts of EDTA) in polyethylene glycol becomes less and less as the polymerization degree of polyethylene glycol increases. When the polymerization degree of polyethylene glycol is more than 12, EDTA (including various salts of EDTA) is practically insoluble in polyethylene glycol. Therefore, in order to increase the solubility of EDTA (including various salts of EDTA) in polyethylene glycol, an appropriate amount of ethylene glycol or polyethylene glycol having a polymerization degree of less than 8 can be added to the polyethylene glycol.

In the desulfurization method by compound alcohol-amine solution according to the present invention, first, the compound alcohol-amine solution is used to absorb $SO_x$ (x=2 and/or 3) in the gas, and then the compound alcohol-amine solution with absorbed $SO_x$ is regenerated by one or more of heating method, vacuum method, gas stripping method, ultrasonic method, microwave method, and radiation method, and the regenerated compound alcohol-amine solution is recycled for use. When the regenerated compound alcohol-amine solution has relatively high water content and the desulfurization effects are influenced, it is needed to remove water from the compound alcohol-amine solution. The methods for removing water include distillation method by heating, absorption method with water absorbent or combination thereof. The compound alcohol-amine solution with water removed is recycled for use.

According to the desulfurization method by compound alcohol-amine solution of the present invention, there are no special requirements for the total content of $SO_x$ in the gas containing sulfur before desulfurization. However, in order to achieve a better desulfurization effect, it is preferred that the total content of $SO_x$ in the gas containing sulfur should be less than 99.9% (volume percent). In the desulfurization method by compound alcohol-amine solution according to the present invention, there are no strict restrictions on processing conditions. However, it is preferred that the absorption is performed under a normal or increased pressure and the absorption temperature is preferably −20-80° C. Next, the compound alcohol-amine solution with absorbed $SO_x$ is regenerated by one or more of heating method, vacuum method, gas stripping method, ultrasonic method, microwave method, and radiation method. Preferably, the regeneration temperature is 0 to 300° C.

The compound alcohol-amine solution is a liquid fluid formed by mixing ethylene glycol and/or polyethylene glycol with hydroxyl organic compound having basic group containing nitrogen and/or carboxylic acid organic compound having basic group containing nitrogen and/or carboxylate organic compound having basic group containing nitrogen, in which the total mass percent content of ethylene glycol and/or polyethylene glycol and hydroxyl organic compound having basic group containing nitrogen and/or carboxylic acid organic compound having basic group containing nitrogen and/or carboxylate organic compound having basic group containing nitrogen is more than or equal to 80%, and the mass percent content of water is less than 20%.

In the desulfurization method by compound alcohol-amine solution according to the present invention, when the compound alcohol-amine solution with absorbed $SO_x$ is regenerated by one or more of heating method, vacuum method, gas stripping method, ultrasonic method, microwave method, and radiation method, sulfur dioxide and/or sulfur trioxide are byproducts.

The fundamental principle of the invention is as follows:

For better explaining the principle of the present invention, diethylene glycol and triethanolamine and/or EDTA disodium salt are exemplified. However, it does not mean that the compound alcohol-amine solution according to the present invention is limited to the solution consisting of diethylene glycol and triethanolamine and/or EDTA disodium salt. Further, it cannot be construed as limiting the claims of the present invention.

The following absorption reactions take place when a flue gas or another gas containing $SO_x$ is contacted with the compound alcohol-amine solution:

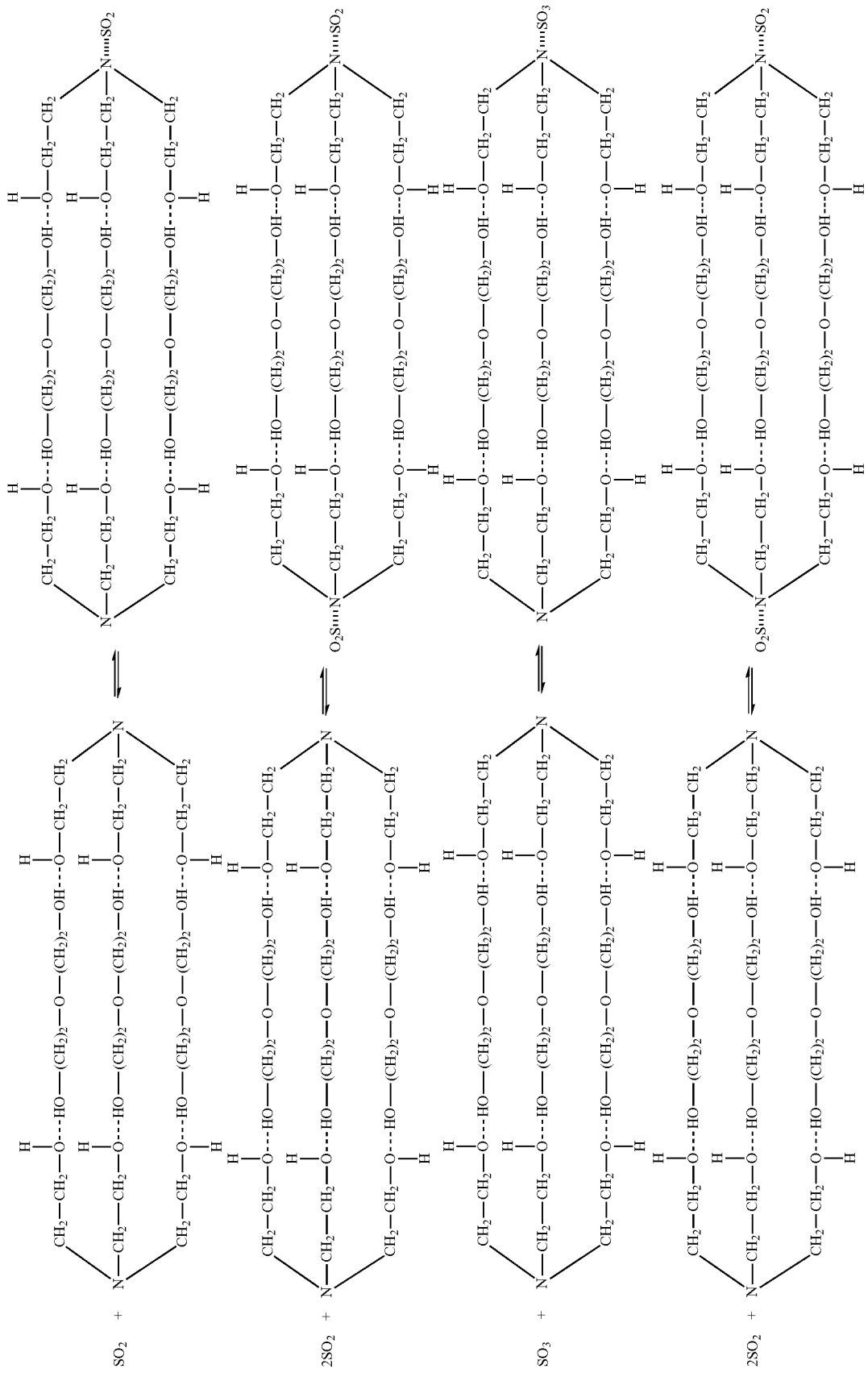

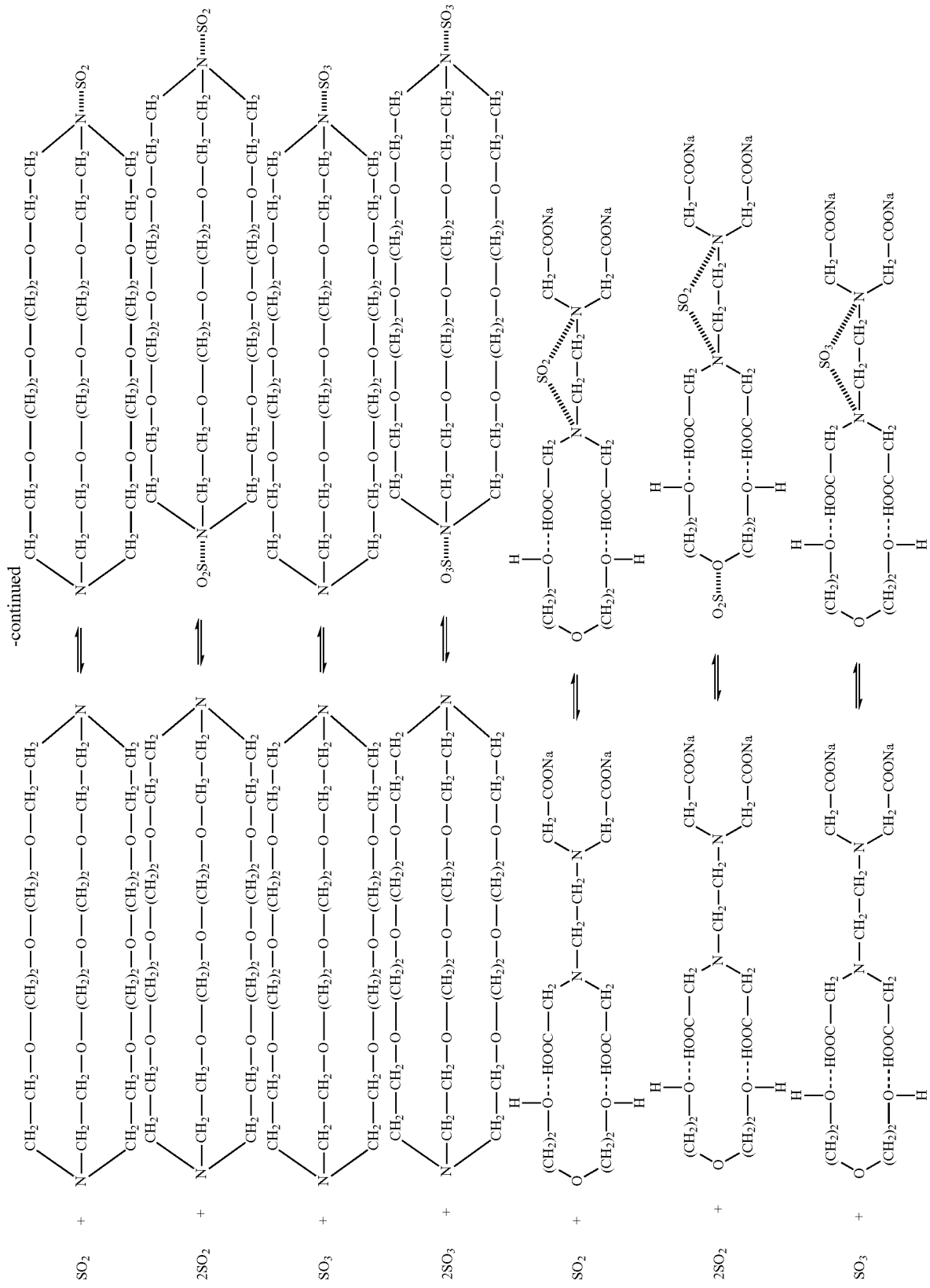

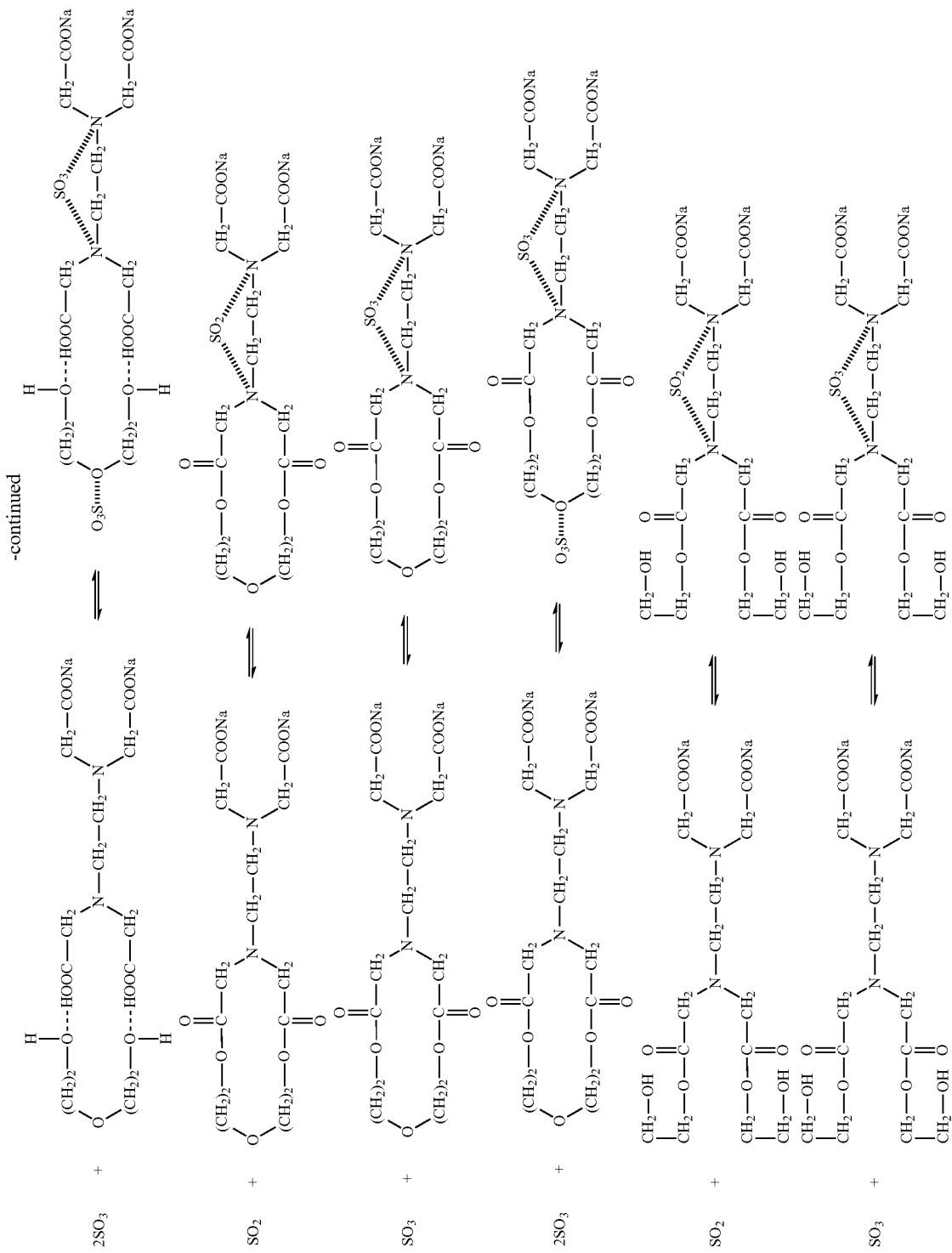

The compound alcohol-amine solution with absorbed sulfur dioxide and sulfur trioxide is converted into a rich liquor, flows out from the bottom of desulfurization tower and flows into regenerator to be regenerated by one or more of heating method, vacuum method, gas stripping method, ultrasonic method, microwave method, and radiation method, releasing sulfur dioxide and/or sulfur trioxide of high purity. The following regeneration reactions will take place in the regenerator for the rich liquor.

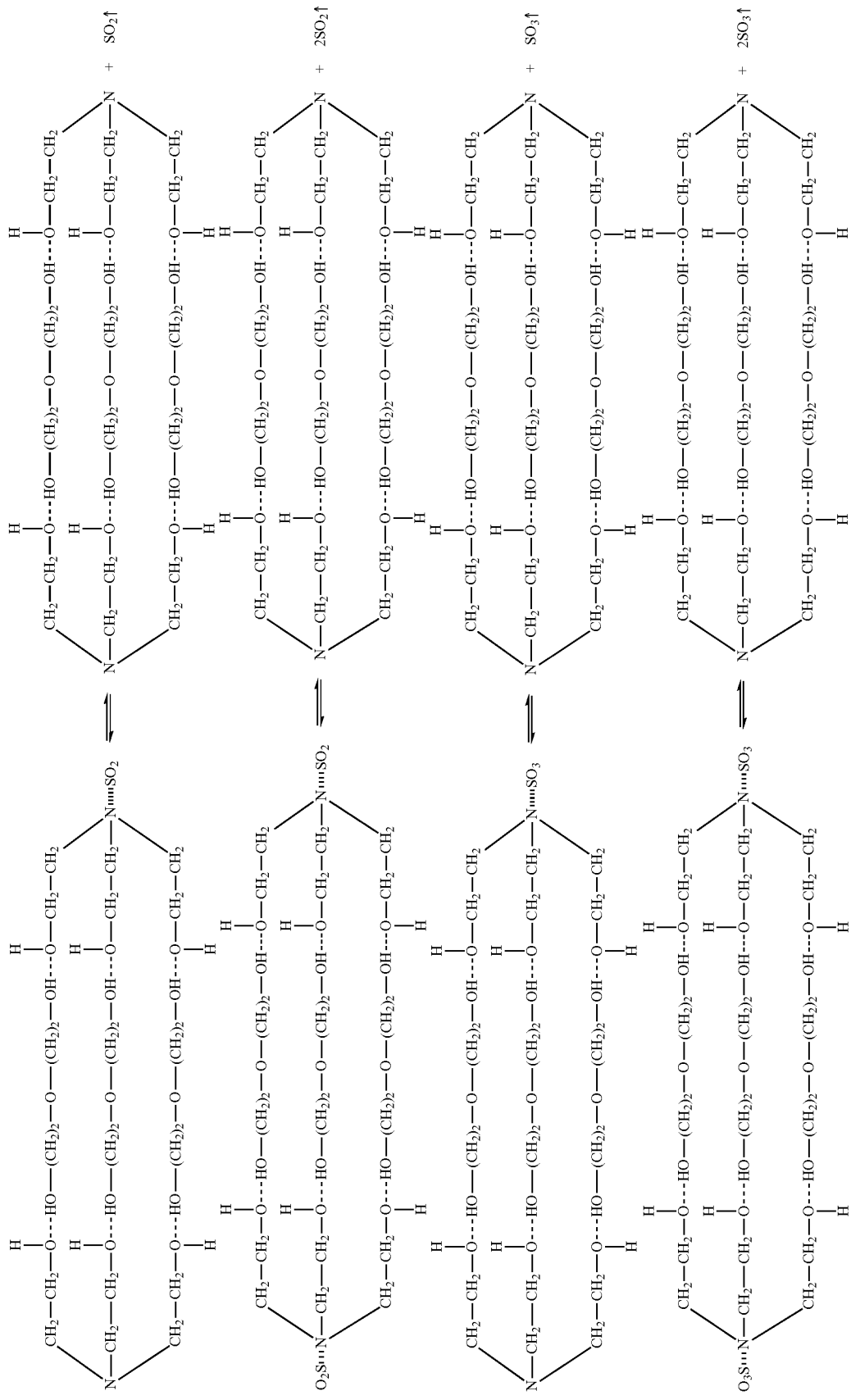

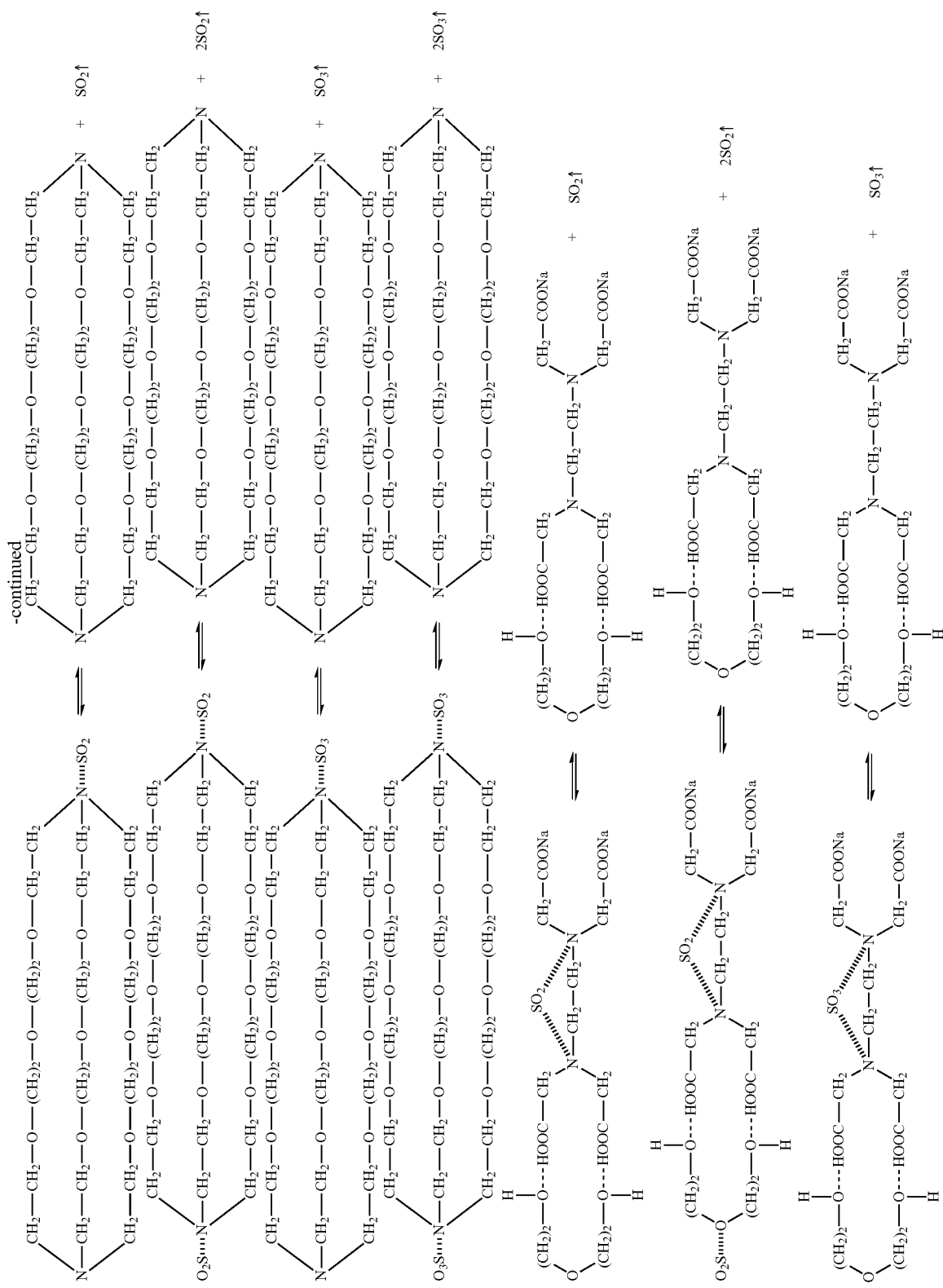

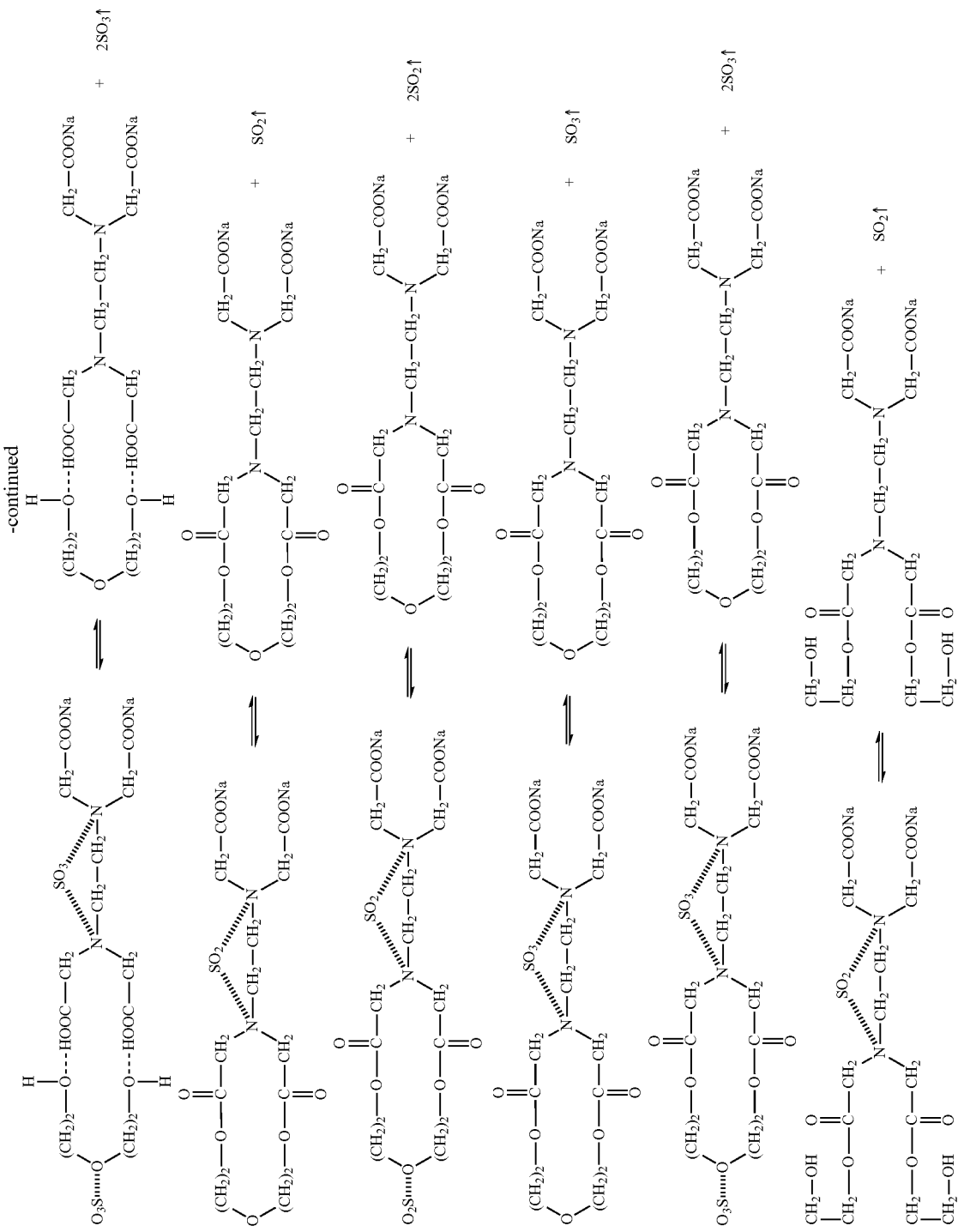

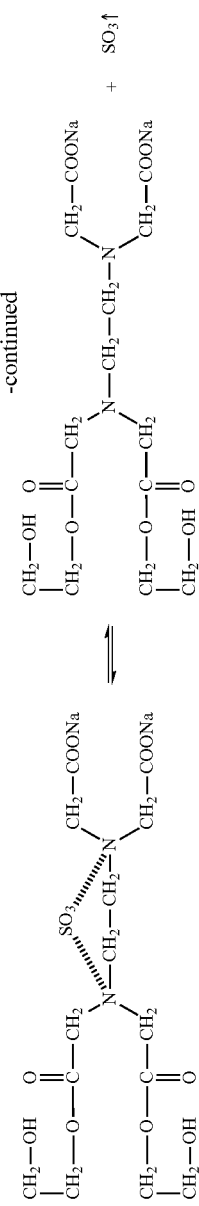

It is found through experimental study that the capability of the compound alcohol-amine solution to absorb sulfur will significantly decrease when the compound alcohol-amine solution contains water. Therefore, the water contained in the compound alcohol-amine solution should be removed as much as possible. The lower the water content is, the better the desulfurization effect is. However, in practical desulfurization, it is impossible to completely remove the water from the compound alcohol-amine solution. In order to reduce the cost of water removal reasonably while ensuring that the compound alcohol-amine solution can absorb sulfur effectively, the mass percent content of water in the compound alcohol-amine solution can be decreased to 20% or less.

The regenerated compound alcohol-amine solution (hereinafter, simply referred to as "desulfurization solution") is recycled for use.

In order to achieve the fundamental principle described above, two processes are designed. The first process is a desulfurization and absorption process, and the second process is a regeneration process of the desulfurization solution. The regeneration methods used in the regeneration process of the desulfurization solution include heating method, vacuum method, gas stripping method, ultrasonic method, microwave method, and radiation method.

The first process is described as follows: The desulfurization and absorption process can be an atmospheric absorption process or a pressurized absorption process. The desulfurization and absorption process is shown in FIG. 1. The desulfurization and absorption process takes place in the desulfurization tower. Usually, the gas containing $SO_x$ is fed into the desulfurization tower from the bottom of the desulfurization tower. The regenerated desulfurization solution (usually referred to as "lean liquor") is charged into the desulfurization tower from the top of the desulfurization tower. In the desulfurization tower, the gas containing $SO_x$ is contacted with the desulfurization solution counter-currently and the $SO_x$ in the gas is absorbed by the desulfurization solution. Then, the gas with $SO_x$ removed is discharged out from the top of the desulfurization tower. The desulfurization solution with absorbed $SO_x$ in the gas is converted into "rich liquor". The "rich liquor" is discharged out from the bottom of the desulfurization tower and then flows to the regeneration process. Alternatively, both the gas and the desulfurization solution can be charged into the desulfurization tower from the top of the desulfurization tower during the absorption process. The absorption is carried out concurrently in the desulfurization tower.

The second process is the regeneration process of the desulfurization solution. The regeneration methods used include heating method, vacuum method, gas stripping method, ultrasonic method, microwave method, and radiation method.

The schematic flow diagram of the regeneration by heating method is shown in FIG. 2. The desulfurization "rich liquor" with absorbed $SO_x$ is charged into a heating-regenerator and regenerated by heating to release $SO_2$ and/or $SO_3$. The regenerated desulfurization solution by heating is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

The schematic flow diagram of the regeneration by vacuum method is shown in FIG. 3. The desulfurization "rich liquor" with absorbed $SO_x$ is charged into a vacuum regenerator and regenerated by evacuation to release $SO_2$ and/or $SO_3$. The regenerated desulfurization solution by evacuation is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

The schematic flow diagram of the regeneration by gas stripping method is shown in FIG. 4. The desulfurization "rich liquor" with absorbed $SO_x$ is charged into a gas stripping-regenerator. An inert gas (such as nitrogen, argon, and water vapour, etc.) is fed from the bottom of the gas stripping-regenerator. $SO_2$ and/or $SO_3$ are carried out from the desulfurization "rich liquor" by the inert gas, and the desulfurization solution is regenerated. The regenerated desulfurization solution by gas stripping is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

The schematic flow diagram of the regeneration by ultrasonic method and/or microwave method or radiation method is shown in FIG. 5. The desulfurization "rich liquor" with absorbed $SO_x$ is charged into an ultrasonic- and/or microwave- or radiation-regenerator and regenerated by ultrasonic irradiation and/or microwave or radiation to release $SO_2$ and/or $SO_3$. The regenerated desulfurization solution by ultrasonic, and/or microwave, or radiation is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

The regeneration process according to the present invention can adopt two or more of the heating method, vacuum method, gas stripping method, ultrasonic method, microwave method, and radiation method described above in one regenerator.

When the regenerated compound alcohol-amine solution has relatively high water content and the desulfurization effects are influenced, it is needed to remove water from the compound alcohol-amine solution. The methods for removing water include distillation method by heating, absorption method with water absorbent or combination thereof. The compound alcohol-amine solution with water removed is recycled for use.

The desulfurization solution of the compound alcohol-amine solution according to the invention is a solution formed by mixing ethylene glycol, or polyethylene glycol, or a mixed solution of ethylene glycol and polyethylene glycol with hydroxyl/carboxyl organic compound having basic group containing nitrogen. In one embodiment of the present invention, the polyethylene glycol can be polyethylene glycol having a single polymerization degree, or a mixed solution of polyethylene glycols having different polymerization degrees. In one embodiment of the present invention, the hydroxyl/carboxyl organic compound having basic group containing nitrogen can be hydroxyl organic compound having basic group containing nitrogen, or carboxylic acid organic compound having basic group containing nitrogen, or carboxylate organic compound having basic group containing nitrogen, or any combination thereof. The hydroxyl organic compound having basic group containing nitrogen described herein is alcoholamine compound (such as, monomethanolamine, dimethanolamine, trimethanolamine, monoethanolamine, diethanolamine, triethanolamine, N,N-dimethyl ethanolamine, N,N-diethyl ethanolamine, N,N-diisopropyl ethanolamine, N-methyl diethanolamine, monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethyl aniline, N-ethyl-N-hydroxyethyl aniline, N-methyl-N-hydroxyethyl aniline, o-aminophenol, m-aminophenol, p-aminophenol, 2,4,6-tri(dimethylaminomethyl)phenol, 3-diethylaminophenol, 2-amino-5-nitrophenol, aminothiaoximoacid, N-methylpyrrolidinyl alcohol, 2,4-diamino-6-hydroxy pyrimidine, cyanuric acid, 2-(2'-hydroxy-5'-methylphenyl)benzotriazole, Gamma acid, J acid, phenyl J acid, Chicago acid and its salts, H acid and its salts, di-J acid, scarlet acid and its salts and the like). The carboxylic acid organic compound having basic group containing nitrogen is an organic compound comprising both carboxylic acid group and amine group in a molecule (more than one carboxylic acid groups can be comprised in the same molecule, or more than one amine groups can be comprised in the same molecule, and the amine groups can be primary amine groups, secondary amine groups, tertiary amine groups or quaternary ammonium groups) (such as, various amino acids, EDTA, nitrilotriacetic acid, cyanoacetic acid, hippuric acid, o-aminobenzoic acid, m-aminobenzoic acid, p-aminobenzoic acid, o-aminophenylacetic acid, p-aminophenylacetic acid, o-aminophenylpropionic acid, m-aminophenylpropionic acid, p-aminophenylpropionic acid, o-aminophenylbutyric acid, m-aminophenylbutyric acid, p-aminophenylbutyric acid, o-aminophenylpentoic acid, m-aminophenylpentoic acid, p-aminophenylpentoic acid, o-aminophenylhexylic acid, m-aminophenylhexylic acid, p-aminophenylhexylic acid, isonicotinic acid, 2,3-pyrazine dicarboxylic acid and the like). The carboxylate organic compound having basic group containing nitrogen is carboxylate organic compound comprising both carboxylic acid group and amine group in a molecule (more than one carboxylic acid groups can be comprised in the same molecule, at least one of which are bound with ions such as ammonium ion, and/or sodium ion, and/or potassium ion, and/or magnesium ion, and/or calcium ion, and/or transition metal ion to form carboxylate, or more than one amine groups can be comprised in the same molecule, and the amine groups can be primary amine groups, secondary amine groups, tertiary amine groups or quaternary ammonium groups) (such as, various amino acid salts, EDTA salts, nitrilotriacetic acid salts, cyanoacetic acid salts, hippuric acid salts, o-aminobenzoic acid salts, m-aminobenzoic acid salts, p-aminobenzoic acid salts, o-aminophenylacetic acid salts, m-aminophenylacetic acid salts, p-aminophenylacetic acid salts, o-aminophenylpropionic acid salts, m-aminophenylpropionic acid salts, p-aminophenylpropionic acid salts, o-aminophenylbutyric acid salts, m-aminophenylbutyric acid salts, p-aminophenylbutyric acid salts, o-aminophenylpentoic acid salts, m-aminophenylpentoic acid salts, p-aminophenylpentoic acid salts, o-aminophenylhexylic acid salts, m-aminophenylhexylic acid salts, p-aminophenylhexylic acid salts, isonicotinic acid salts, 2,3-pyrazine dicarboxylic acid salts and the like).

In the compound alcohol-amine solution according to the invention, the content of ethylene glycol, or polyethylene glycol, or the mixture of ethylene glycol and polyethylene glycol is more than or equal to 50% (mass content), the content of hydroxyl/carboxyl organic compound having basic group containing nitrogen is in the range of 0.1% to 30% (mass content), and the water content is less than 20% (mass content).

In order to improve the capability of the compound alcohol-amine solution to absorb sulfur, a certain amount of additives can be added to the compound alcohol-amine solution according to the invention. The additives can be organic amines, amides, sulfones, sulfoxides, organic acids, organic acid salts, and metallorganic compounds. The organic amines include alkylamines (for example aliphatic amines such as monomethylamine, dimethyl amine, trimethylamine, monoethylamine, diethylamine, triethylamine, monopropylamine, dipropylamine, tripropylamine, n-propylamine, iso-propylamine, monobutylamine, dibutylamine, tributylamine, n-butylamine, sec-butylamine, iso-butylamine, tert-butylamine, ethylenediamine, propanediamine, hexamethylenediamine, triethylenediamine, diethylenetriamine, triethylenetetraamine, tetraethylenepentaamine, polyethylenepolyamine), and aromatic amines (such as aniline, N-methylaniline, N-ethylaniline, N-propylaniline, N-butylaniline, N,N-dimethyl aniline, N,N-diethylaniline, N,N-dipropylaniline, N,N-dibutylaniline, phenylenediamine, alpha-naphthylamine, halogenated aniline, nitroaniline, sulfonic aniline and the like). The amides include formylamide, acetamide, DMF, MDEA, formanilide, acetanilide, propionanilide, butyrylanilide, benzyldimethyl amine, benzyldiethylamine, benzyldimethylpropylamine, benzyldibutylamine and the like. The sulfones and sulfoxides include dimethyl sulfone, diethyl sulfone, dipropyl sulfone, dibutyl sulfone, bis-hydroxyethyl sulfone and the like, dimethyl sulfoxide (DMSO), diethyl sulfoxide, dipropyl sulfoxide, dibutyl sulfoxide and the like. The organic acids include organic monoacids, organic diacids, organic triacids, and organic polyacids and the like. The organic acid salts include organic acid salts of alkali metals, alkali earth metals, and transition metals (such as salicylic acid salts, tannin acid salts, gallic acid salts, citric acid salts and the like). The metallorganic compounds include transition metallorganic compounds and the like. One, two or more of the additives described above can be added to the compound alcohol-amine solution. The additives are present in the compound alcohol-amine solution in a content of less than 10% (mass content).

Compared with the conventional wet desulfurization process (for example calcium desulfurization process, and amine desulfurization process), the invention has the following advantages. (1) The conventional wet desulfurization process can only be applied to the desulfurization of gas having relatively low sulfur content. The desulfurization method by compound alcohol-amine solution according to the invention can be applied to the desulfurization of gas having low sulfur content and gas having high sulfur content. (2) For the conventional wet desulfurization process, insoluble precipitate of calcium salt or ammonium salt will be produced during the whole process of desulfurization and regeneration, causing equipments and pipes to be clogged. For the desulfurization method by compound alcohol-amine solution according to the invention, there is substantially no insoluble precipitate of calcium salt or ammonium salt. (3) For the conventional wet desulfurization process used for removing sulfur from flue gas, the by-products are calcium sulfate and calcium sulfite, or ammonium sulfate and ammonium sulfite. For the desulfurization method by compound alcohol-amine solution according to the invention, the by-products are sulfur dioxide and/or sulfur trioxide of high purity, which have broad markets and significant applications as important chemical raw materials. (4) For our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)", some sulfinates and sulfonates will be produced during operation, such that the capability of the solution to absorb sulfur decreases, and the solution deteriorates, thereby damaging the system and even making the system unworkable. For the desulfurization method by compound alcohol-amine solution according to the invention, sulfinates and sulfonates will not be produced in the solution during operation, and the solution will not deteriorate. Therefore, the solution is stable and thus the operation is stable. In addition, according to the desulfurization method by compound alcohol-amine solution of the invention, the sulfur in gas can be purified sufficiently and the total sulfur content in gas can be steadily decreased to 50 $mg/m^3$ or less. The gas/liquid ratio of the desulfurization is large, and the energy consumption is low. Further, the running cost is low, the operating period is short, the investment is low and the operation is simple. The desulfurization method by compound alcohol-amine solution according to the invention has broad industrial applications and can be used for desulfurization of flue gas, burning gas, coke-oven gas, synthesis waste gas from dyestuff plants, sewage gas from chemical fiber plants, and other industrial raw material gases or waste gases containing $SO_x$. The total sulfur content in the above gases containing sulfur is less than 99.9% (volume percent).

DETAILED DESCRIPTION

The desulfurization method by compound alcohol-amine solution according to the invention is described below with reference to some specific embodiments. The embodiments described hereinafter are only for better illustrating the present invention rather than limiting the claims of the present invention.

Figure 1:
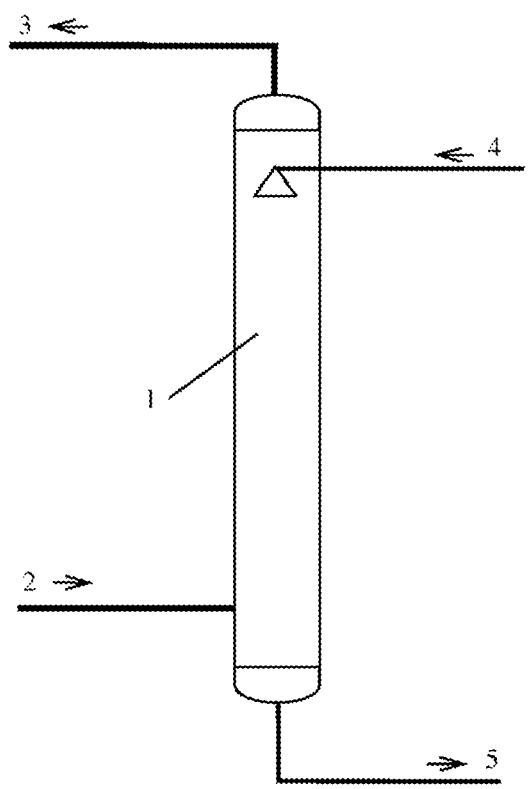
FIG. 1 is a schematic diagram of desulfurization and absorption process.

The first process is a desulfurization and absorption process as shown in FIG. 1. The gas 2 containing $SO_x$ is fed from the bottom of the desulfurization tower 1 and contacted with the desulfurization lean liquor 4 counter-currently. The $SO_x$ in the gas 2 containing $SO_x$ is absorbed by the lean liquor 4. The gas 2 containing $SO_x$ is converted into purified gas 3 which is discharged out from the top of the desulfurization tower 1. The desulfurization lean liquor 4 with absorbed $SO_x$ is converted into desulfurization rich liquor 5 at the bottom of the desulfurization tower 1. The desulfurization rich liquor 5 is discharged out from the bottom of the desulfurization tower 1 and transferred to the regenerator to be regenerated by one or more of heating method, vacuum method, gas stripping method, ultrasonic method, microwave method, and radiation method.

The second process is the regeneration process of desulfurization solution. The regeneration methods for it include heating method, vacuum method, gas stripping method, ultrasonic method, microwave method, and radiation method.

Figure 2:
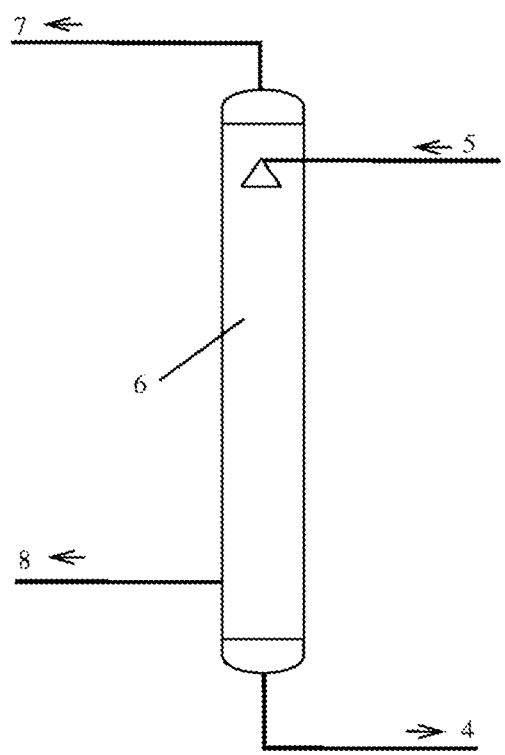
FIG. 2 is a schematic diagram of desulfurization solution regeneration by heating method.

The regeneration method by heating is shown in FIG. 2. The desulfurization rich liquor 5 is transferred to the heating-regenerator 6 and is heated to release gaseous sulfur dioxide and/or sulfur trioxide 7. The gaseous sulfur dioxide and/or sulfur trioxide 7 are processed into by-products of liquid sulfur dioxide and/or sulfur trioxide of high purity. Meanwhile, sulfur foams and/or dusts 8 may be produced or accumulated, and are separated from the desulfurization solution. The separated sulfur foams and/or dusts 8 can be further processed into sulfur by-products, and there are also some ash residues discharged. The desulfurization rich liquor 5 is regenerated by heating-regenerator 6 and is then converted into the desulfurization lean liquor 4. The desulfurization lean liquor 4 can be transferred directly to the desulfurization and absorption process for recycle use. Alternatively, it can be transferred to the vacuum-regenerator and/or gas stripping-regenerator, and/or ultrasonic-regenerator, and/or microwave-regenerator, and/or radiation-regenerator to be further regenerated.

Figure 3:
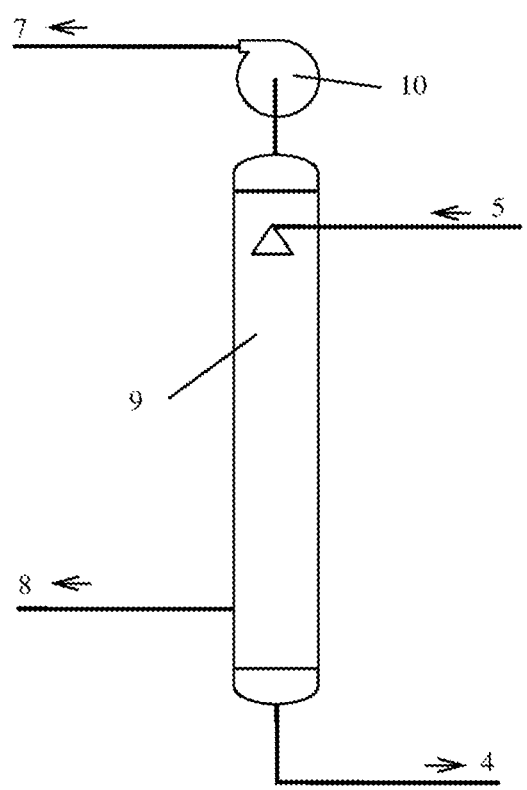
FIG. 3 is a schematic diagram of desulfurization solution regeneration by vacuum method.

The regeneration method by vacuum is shown in FIG. 3. The desulfurization rich liquor 5 is transferred to the vacuum-regenerator 9, vacuum is created with the aid of vacuumizer 10 to release gaseous sulfur dioxide and/or sulfur trioxide 7. The gaseous sulfur dioxide and/or sulfur trioxide 7 are processed into by-products of liquid sulfur dioxide and/or sulfur trioxide of high purity. Meanwhile, sulfur foams and/or dusts 8 may be produced or accumulated, and are separated from the desulfurization solution. The separated sulfur foams and/or dusts 8 can be further processed into sulfur by-products, and there are also some ash residues discharged. The desulfurization rich liquor 5 is regenerated by vacuum-regenerator 9 and is then converted into the desulfurization lean liquor 4. The desulfurization lean liquor 4 can be transferred directly to the desulfurization and absorption process for recycle use. Alternatively, it can be transferred to the heating-regenerator and/or gas stripping-regenerator, and/or ultrasonic-regenerator, and/or microwave-regenerator, and/or radiation-regenerator to be further regenerated.

Figure 4:
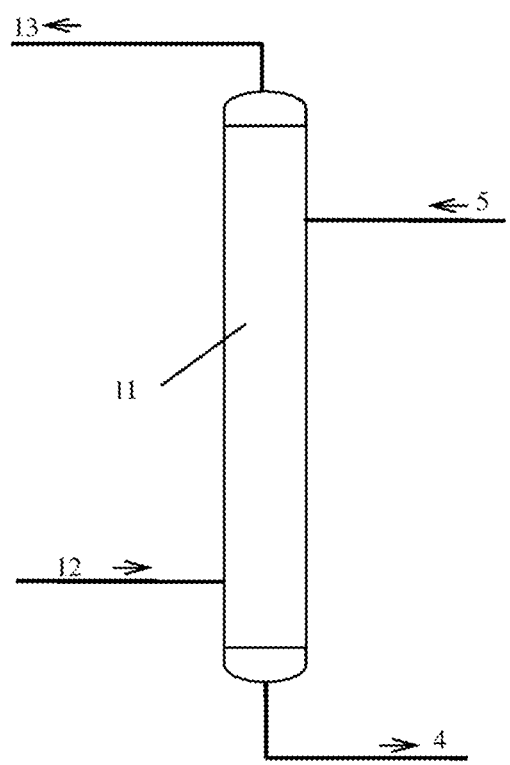
FIG. 4 is a schematic diagram of desulfurization solution regeneration by gas stripping method.

The regeneration method by gas stripping is shown in FIG. 4. The desulfurization rich liquor 5 is transferred to the gas stripping-regenerator 11, and contacted counter-currently with the inert gas 12 (including nitrogen, argon and water vapour, etc.) from the bottom of the gas stripping-regenerator 11. The sulfur dioxide and/or sulfur trioxide in the desulfurization rich liquor 5 are released into the inert gas and a mixed gas 13 of sulfur dioxide and/or sulfur trioxide with high concentration is formed and discharged from the top of the gas stripping-regenerator 11. The discharged sulfur dioxide and/or sulfur trioxide in the inert gas are processed into by-products of liquid sulfur dioxide and/or sulfur trioxide of high purity. The desulfurization rich liquor 5 is regenerated by the gas striping-regenerator 11 and is then converted into the desulfurization lean liquor 4. The desulfurization lean liquor 4 can be transferred directly to the desulfurization and absorption process for recycle use. Alternatively, it can be transferred to the heating-regenerator and/or vacuum-regenerator, and/or ultrasonic-regenerator, and/or microwave-regenerator, and/or radiation-regenerator to be further regenerated.

Figure 5:
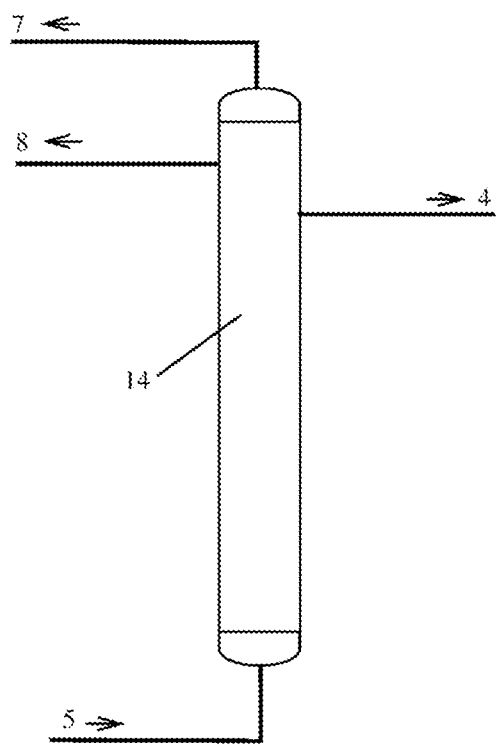
FIG. 5 is a schematic diagram of desulfurization solution regeneration by ultrasonic method, and/or microwave method, and/or radiation method.

The regeneration by ultrasonic method, and/or microwave method, and/or radiation method is shown in FIG. 5. The desulfurization rich liquor 5 is transferred to the ultrasonic-, and/or microwave-, and/or radiation-regenerator 14 and regenerated under the conditions of ultrasonic, and/or microwave, and/or radiation to release gaseous sulfur dioxide and/or sulfur trioxide 7. The gaseous sulfur dioxide and/or sulfur trioxide 7 are processed into by-products of liquid sulfur dioxide and/or sulfur trioxide of high purity. Meanwhile, sulfur foams and/or dusts 8 may be produced or accumulated, and are separated from the desulfurization solution. The separated sulfur foams and/or dusts 8 can be further processed into sulfur by-products, and there are also some ash residues discharged. The desulfurization rich liquor 5 is regenerated by ultrasonic-, and/or microwave-, and/or radiation-regenerator 14 and is then converted into the desulfurization lean liquor 4. The desulfurization lean liquor 4 can be transferred directly to the desulfurization and absorption process for recycle use. Alternatively, it can be transferred to the heating-regenerator, and/or vacuum-regenerator, and/or gas stripping-regenerator to be further regenerated.

When the regenerated compound alcohol-amine solution has relatively high water content and the desulfurization effects are influenced, it is needed to remove water from the compound alcohol-amine solution. The methods for removing water include distillation method by heating, absorption method with water absorbent or combination thereof. The compound alcohol-amine solution with water removed is recycled for use. The commonly used water absorbents include CaO, anhydrous $CaSO_4$, silica gel and water absorbent resins.

Figure 6:
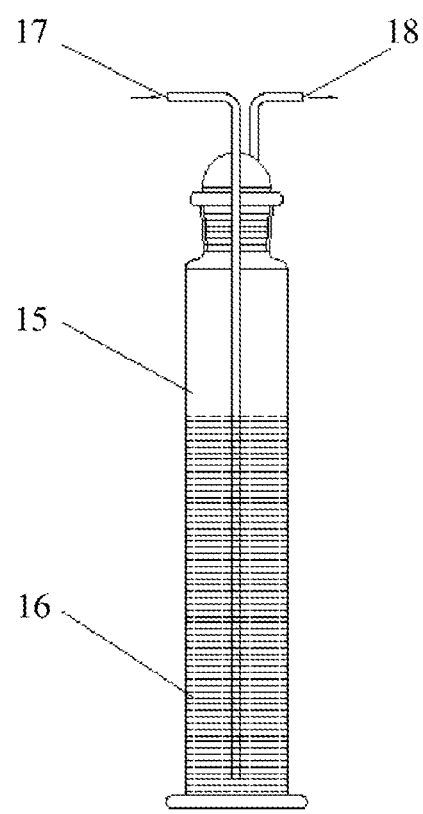
FIG. 6 is a schematic diagram of structure of a small-sized desulfurization and absorption device.
Figure 7:
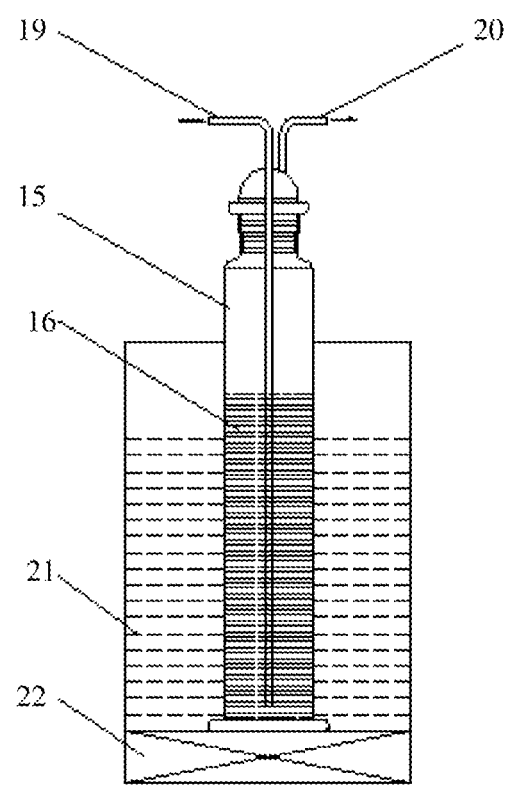
FIG. 7 is a schematic diagram of structure of a small-sized heating and gas stripping-regeneration device.

According to the specific concepts of the above embodiments, a small-sized absorption device shown in FIG. 6 and a small-sized heating and gas stripping-regeneration device shown in FIG. 7 were designed and mounted respectively.

As shown in FIG. 6, in the small-sized absorption device, 15 represented an absorption bottle (or a regeneration bottle if regeneration was carried out), 16 represented the compound alcohol-amine solution, 17 represented the gas containing sulfur dioxide, and 18 represented a vented gas.

As shown in FIG. 7, in the small-sized heating and gas stripping-regeneration device, 15 represented a regeneration bottle (or an absorption bottle if absorption was carried out), 16 represented the compound alcohol-amine solution with absorbed sulfur dioxide, 19 represented a gas for gas stripping ($N_2$ in this test), 20 represented the stripping gas with sulfur dioxide contained, 21 represented a silicone oil for oil bath, and 22 represented a thermostatic heating pot.

In the experiment, as shown in FIG. 6, about 100 ml fresh compound alcohol-amine solution 16 was charged into the absorption bottle 15. A certain amount (L, litre) of gas 17 containing sulfur dioxide was blown into the absorption bottle 15 containing the compound alcohol-amine solution 16 at room temperature and passed through the compound alcohol-amine solution 16. The sulfur dioxide in the gas was absorbed by the compound alcohol-amine solution 16. The gas with sulfur dioxide removed was referred to as the vented gas 18. The vented gas 18 was discharged outside. At the same time, the content of sulfur dioxide ($C^*_{SO2}$, g/L) in the compound alcohol-amine solution 16 was measured using iodimetry. Then, the absorption bottle containing the compound alcohol-amine solution with absorbed sulfur dioxide was placed into the thermostatic heating pot in the oil bath. At this time, the absorption bottle 15 served as the regeneration bottle 15. The content of sulfur dioxide in the compound alcohol-amine solution 16 had already been measured and it could be used as the compound alcohol-amine solution 16 with absorbed sulfur dioxide to be regenerated. As shown in FIG. 7, the temperature in the thermostatic heating pot 22 was adjusted to a desired constant temperature by heating the silicone oil 21 for oil bath. When the temperature of the system was kept at the desired temperature (t, ° C.), the gas 19 for gas stripping ($N_2$ in this test) was blown into the regeneration bottle 15. The gas 19 for gas stripping ($N_2$ in this test) was sufficiently contacted with the compound alcohol-amine solution 16 containing sulfur dioxide. At this time, the sulfur dioxide contained in the compound alcohol-amine solution 16 was transferred into the gas 19 for gas stripping ($N_2$ in this test). At this time, the gas 19 for gas stripping ($N_2$ in this test) containing sulfur dioxide was transformed into the stripping gas 20 with contained sulfur dioxide, vented and discharged outside. After being regenerated for a period of time (T, min) by heating and gas stripping, the regeneration bottle 15 was taken out and cooled to normal temperature with water. The content of sulfur dioxide ($C_{SO2}$, g/L) in the regenerated compound alcohol-amine solution 16 was measured using iodimetry. The absorption and regeneration of the regenerated compound alcohol-amine solution 16 were repeated many times in accordance with the above steps. The changes appeared in the compound alcohol-amine solution were observed. According to the above test, the experiments for the absorption and desorption of $SO_2$ contained in the gas were repeated many times with a system of EG +5% triethanolamine, a system of PEG(400)+5% triethanolamine, a system of EG +10% EDTA, a system of EG+2% EDTA disodium salt, a system of EG +5% EDTA disodium salt, a system of EG +10% EDTA disodium salt, and a system of EG+2% EDTA disodium salt+1% triethanolamine. The experiment data were respectively listed in table 1, table 2, table 3, table 4, table 5, table 6 and table 7.

TABLE 1 the absorption and desorption of $SO_2$ with EG + 5% triethanolamine (150 mL)

| Numbers of absorption and regeneration | Volume of gas to be absorbed (the content of $SO_2$ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 1st | 36 | 6.9924 | 3.1993 | 150 | 30 | The color of |
| 2nd | 6 | 4.6176 | 2.9685 | 150 | 30 | the solution |
| 3rd | 6.4 | 4.4527 | 3.0344 | 150 | 30 | gradually |
| 4th | 10 | 5.6071 | 2.9025 | 150 | 30 | turned into |
| 5th | 6 | 5.5411 | 2.0120 | 150 | 30 | brownish red |
| 6th | 6 | 3.8260 | 2.2758 | 150 | 30 | from |
| 7th | 6 | 4.4527 | 2.2428 | 140 | 30 | colorless. |
| 8th | 6 | 2.6386 | 1.9790 | 140 | 30 | |
| 9th | 6 | 2.0779 | 1.9130 | 140 | 30 | |
| 10th | 6 | 2.5727 | 1.9790 | 140 | 30 | |
| 11th | 6 | 2.6716 | 1.9460 | 140 | 30 | |
| 12th | 6 | 2.3418 | 1.7481 | 140 | 30 | |

TABLE 2 the absorption and desorption of $SO_2$ with PEG(400) + 5% triethanolamine (150 mL)

| Numbers of absorption and regeneration | Volume of gas to be absorbed (the content of $SO_2$ in the gas is about 1500 ppm) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 1st | 55 | 1.6194 | 0.1747 | 130 | 30 | The color of |
| 2nd | 12 | 0.5398 | 0.1270 | 130 | 30 | the solution |
| 3rd | 12 | 0.5557 | 0.1588 | 130 | 30 | gradually |
| 4th | 12 | 0.5081 | 0.1429 | 130 | 30 | turned into |
| 5th | 12 | 0.5239 | 0.1429 | 130 | 30 | brownish red |
| 6th | 12 | 0.4446 | 0.1040 | 130 | 30 | from |
| 7th | 12 | 0.5199 | 0.2773 | 130 | 30 | colorless. |
| 8th | 13 | 0.6066 | 0.4333 | 130 | 30 | |
| 9th | 13 | 0.8319 | 0.4853 | 130 | 30 | |
| 10th | 12 | 0.7361 | 0.3848 | 130 | 30 | |
| 11th | 12 | 0.7361 | 0.1338 | 130 | 30 | |
| 12th | 12 | 0.5186 | 0.1004 | 130 | 30 | |

TABLE 3 the absorption and desorption of $SO_2$ with EG + 10% EDTA (150 mL)

| Numbers of absorption and regeneration | Volume of gas to be absorbed (the content of $SO_2$ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 1st | 4 | 0.7421 | 0.0825 | 130 | 30 | The color of |
| 2nd | 4 | 0.8410 | 0.0825 | 130 | 30 | the solution |
| 3rd | 4 | 0.7586 | 0.0330 | 130 | 30 | gradually |
| 4th | 4 | 0.8410 | 0.0330 | 130 | 30 | turned into |

TABLE 3-continued the absorption and desorption of SO$_2$ with EG + 10% EDTA (150 mL)

| Numbers of absorption and regeneration | Volume of gas to be absorbed (the content of SO$_2$ in the gas is about 1%) L (liter) | Content of sulfur dioxide in the compound alcohol-amine solution after absorption C*$_{SO2}$ (g/L) | Content of sulfur dioxide in the compound alcohol-amine solution after regeneration C$_{SO2}$ (g/L) | Regeneration temperature t (° C.) | Regeneration time T (min) | Appearance of the compound alcohol-amine solution after regeneration |
|---|---|---|---|---|---|---|
| 5$^{th}$ | 4 | 0.8246 | 0.0330 | 130 | 30 | faint yellow |
| 6$^{th}$ | 4 | 0.7916 | 0.0495 | 130 | 30 | from |
| 7$^{th}$ | 4 | 0.8576 | 0.0330 | 130 | 30 | colorless. |

TABLE 4 the absorption and desorption of SO$_2$ with EG + 2% EDTA disodium salt (150 mL)

| Numbers of absorption and regeneration | Volume of gas to be absorbed (the content of SO$_2$ in the gas is about 1%) L (liter) | Content of sulfur dioxide in the compound alcohol-amine solution after absorption C*$_{SO2}$ (g/L) | Content of sulfur dioxide in the compound alcohol-amine solution after regeneration C$_{SO2}$ (g/L) | Regeneration temperature t (° C.) | Regeneration time T (min) | Appearance of the compound alcohol-amine solution after regeneration |
|---|---|---|---|---|---|---|
| 1$^{st}$ | 3 | 0.8246 | 0.8246 | 135 | 30 | The color of |
| 2$^{nd}$ | 20 | 7.0913 | 0.7615 | 135 | 30 | the solution |
| 4$^{th}$ | 10 | 6.1678 | 0.6597 | 135 | 30 | gradually |
| 3$^{rd}$ | 10 | 6.2667 | 0.6597 | 135 | 30 | turned into |
| 5$^{th}$ | 10 | 3.3643 | 0.4947 | 135 | 30 | faint yellow |
| 6$^{th}$ | 10 | 4.9474 | 1.6491 | 135 | 15 | from colorless. |

TABLE 5 the absorption and desorption of SO$_2$ with EG + 5% EDTA disodium salt (150 mL)

| Numbers of absorption and regeneration | Volume of gas to be absorbed (the content of SO$_2$ in the gas is about 1%) L (liter) | Content of sulfur dioxide in the compound alcohol-amine solution after absorption C*$_{SO2}$ (g/L) | Content of sulfur dioxide in the compound alcohol-amine solution after regeneration C$_{SO2}$ (g/L) | Regeneration temperature t (° C.) | Regeneration time T (min) | Appearance of the compound alcohol-amine solution after regeneration |
|---|---|---|---|---|---|---|
| 1$^{st}$ | 2.8 | 0.5937 | 0.5937 | / | 0 | The color of |
| 2$^{nd}$ | 2.04 | 0.9895 | 0.5937 | 135 | 30 | the solution |
| 3$^{rd}$ | 2.01 | 1.0884 | 0.4947 | 135 | 30 | gradually |
| 4$^{th}$ | 1.3 | 0.8576 | 0.1649 | 135 | 30 | turned into |
| 5$^{th}$ | 10 | 2.8035 | 0.5937 | 135 | 30 | faint yellow |
| 6$^{th}$ | 10 | 3.5292 | 0.4288 | 135 | 30 | from |
| 7$^{th}$ | 10 | 3.6611 | 0.3958 | 135 | 30 | colorless |
| 8$^{th}$ | 10 | 3.5951 | 0.3958 | 135 | 30 | and |
| 9$^{th}$ | 10 | 3.7930 | 0.3298 | 135 | 30 | maintained |
| 10$^{th}$ | 10 | 3.5951 | 0.6597 | 135 | 30 | to be faint |
| 11$^{th}$ | 10 | 3.8920 | 0.3958 | 135 | 30 | yellow. |
| 12$^{th}$ | 10 | 3.8260 | 0.2968 | 135 | 30 | |
| 13$^{th}$ | 10 | 3.9579 | 0.1979 | 135 | 30 | |
| 14$^{th}$ | 10 | 3.7930 | 0.2968 | 135 | 30 | |
| 15$^{th}$ | 10 | 2.9685 | 0.8246 | 135 | 30 | |
| 16$^{th}$ | 10 | 3.4632 | 0.7586 | 135 | 30 | |
| 17$^{th}$ | 10 | 3.9579 | 0.6597 | 135 | 30 | |
| 18$^{th}$ | 10 | 4.4857 | 1.0225 | 135 | 30 | |

TABLE 5-continued the absorption and desorption of $SO_2$ with EG + 5% EDTA disodium salt (150 mL)

| Numbers of absorption and regeneration | Volume of gas to be absorbed (the content of $SO_2$ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 19$^{th}$ | 10 | 4.5187 | 0.2097 | 135 | 60 | |
| 20$^{th}$ | 10 | 3.3062 | 0.2903 | 135 | 30 | |
| 21$^{st}$ | 10 | 2.8224 | 0.7258 | 135 | 30 | |

TABLE 6 the absorption and desorption of $SO_2$ with EG + 10% EDTA disodium salt (150 mL)

| Numbers of absorption and regeneration | Volume of gas to be absorbed (the content of $SO_2$ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 1$^{st}$ | 10 | 2.7046 | 0.3298 | 135 | 30 | The color of |
| 2$^{nd}$ | 10 | 3.3972 | 0.6597 | 135 | 30 | the solution |
| 3$^{rd}$ | 10 | 3.5621 | 0.4947 | 135 | 30 | gradually |
| 4$^{th}$ | 10 | 3.9250 | 0.4618 | 135 | 30 | turned into |
| 5$^{th}$ | 10 | 3.7930 | 0.6597 | 135 | 30 | brownish red |
| 6$^{th}$ | 10 | 4.7825 | 0.6597 | 135 | 30 | from |
| 7$^{th}$ | 10 | 4.2878 | 0.4947 | 135 | 30 | colorless. |
| 8$^{th}$ | 10 | 4.4527 | 0.4288 | 135 | 30 | |
| 9$^{th}$ | 10 | 4.6836 | 0.4947 | 135 | 30 | |
| 10$^{th}$ | 10 | 4.4857 | 0.7741 | 135 | 30 | |
| 11$^{th}$ | 10 | 3.8062 | 0.6451 | 135 | 30 | |
| 12$^{th}$ | 10 | 4.1126 | 1.2096 | 135 | 30 | |

TABLE 7 the absorption and desorption of $SO_2$ with EG + 2% EDTA disodium salt + 1% triethanolamine (150 mL)

| Numbers of absorption and regeneration | Volume of gas to be absorbed (the content of $SO_2$ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 1$^{st}$ | 10 | 4.1888 | 3.2983 | 135 | 30 | The color of |
| 2$^{nd}$ | 10 | 6.1678 | 3.9579 | 135 | 30 | the solution |
| 3$^{rd}$ | 10 | 6.1018 | 5.1123 | 135 | 30 | gradually |
| 4$^{th}$ | 10 | 6.7615 | 4.4527 | 135 | 30 | turned into |
| 5$^{th}$ | 10 | 6.5966 | 4.4527 | 135 | 30 | brownish red |
| 6$^{th}$ | 10 | 7.9159 | 3.8590 | 135 | 30 | from |
| 7$^{th}$ | 10 | 6.7615 | 4.3550 | 135 | 30 | colorless. |
| 8$^{th}$ | 14 | 8.9054 | 3.7930 | 135 | 30 | |
| 9$^{th}$ | 10 | 7.4211 | 5.3123 | 135 | 30 | |
| 10$^{th}$ | 10 | 10.8843 | 3.1334 | 135 | 30 | |
| 11$^{th}$ | 10 | 8.0808 | 3.6281 | 135 | 30 | |

TABLE 7-continued the absorption and desorption of SO₂ with EG + 2% EDTA disodium salt + 1% triethanolamine (150 mL)

| Numbers of absorption and regeneration | Volume of gas to be absorbed (the content of SO₂ in the gas is about 1%) L (liter) | Content of sulfur dioxide in the compound alcohol-amine solution after absorption $C^*_{SO2}$ (g/L) | Content of sulfur dioxide in the compound alcohol-amine solution after regeneration $C_{SO2}$ (g/L) | Regeneration temperature t (° C.) | Regeneration time T (min) | Appearance of the compound alcohol-amine solution after regeneration |
|---|---|---|---|---|---|---|
| 12th | 10 | 6.2093 | 3.7271 | 135 | 30 | |
| 13th | 10 | 7.7414 | 2.9030 | 135 | 135 | |

From the above experimental data, it can be seen that these compound alcohol-amine solutions have good effects on absorption and regeneration for SO₂. This indicates that these systems are good desulfurization solvents for flue gases.

What is claimed is:

1. A method for removing $SO_x$ from a gas, which comprises: making a compound alcohol-amine solution by mixing ethylene glycol and/or polyethylene glycol with hydroxyl/carboxyl organic compound having basic group containing nitrogen, bringing the compound alcohol-amine solution into contact with the gas containing $SO_x$ to absorb the $SO_x$ in the gas, wherein x=2 and/or 3; the hydroxyl/carboxyl organic compound having basic group containing nitrogen is one or more of hydroxyl organic compound having basic group containing nitrogen, carboxylic acid organic compound having basic group containing nitrogen, and carboxylate organic compound having basic group containing nitrogen, wherein the hydroxyl organic compound having basic group containing nitrogen is alcohol amine compound; the carboxylic acid organic compound having basic group containing nitrogen is organic compound comprising both carboxylic acid group and amine group in a molecule; and the carboxylate organic compound having basic group containing nitrogen is carboxylate organic compound comprising both carboxylic acid group and amine group in a molecule.

2. The method for removing $SO_x$ from a gas according to claim 1, characterized in that, the hydroxyl organic compound having basic group containing nitrogen is selected from one or more of monomethanolamine, dimethanolamine, trimethanolamine, monoethanolamine, diethanolamine, triethanolamine, N,N-dimethyl ethanolamine, N,N-diethyl ethanolamine, N,N-diisopropyl ethanolamine, N-methyl diethanolamine, monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethyl aniline, N-ethyl-N-hydroxyethyl aniline, N-methyl-N-hydroxyethyl aniline, o-aminophenol, m-aminophenol, p-aminophenol, 2,4,6-tri (dimethylaminomethyl)phenol, 3-diethylaminophenol, 2-amino-5-nitrophenol, aminothiaoximoacid, N-methylpyrrolidinyl alcohol, 2,4-diamino-6-hydroxy pyrimidine, cyanuric acid, 2-(2'-hydroxy-5'-methylphenyl)benzotriazole, Gamma acid, J acid, phenyl J acid, Chicago acid and its salts, H acid and its salts, di-J acid, scarlet acid and its salts.

3. The method for removing $SO_x$ from a gas according to claim 1, characterized in that, the carboxylic acid organic compound having basic group containing nitrogen is selected from one or more amino acids, EDTA, nitrilotriacetic acid, cyanoacetic acid, hippuric acid, o-aminobenzoic acid, o-aminophenylacetic acid, o-aminophenylpropionic acid, o-aminophenylbutyric acid, o-aminophenylpentoic acid, o-aminophenylhexylic acid, m-aminobenzoic acid, m-aminophenylacetic acid, m-aminophenylpropionic acid, m-aminophenylbutyric acid, m-aminophenylpentoic acid, m-aminophenylhexylic acid, p-aminobenzoic acid, p-aminophenylacetic acid, p-aminophenylpropionic acid, p-aminophenylbutyric acid, p-aminophenylpentoic acid, p-aminophenylhexylic acid, isonicotinic acid, and 2,3-pyrazine dicarboxylic acid.

4. The method for removing $SO_x$ from a gas according to claim 1, characterized in that, the carboxylate organic compound having basic group containing nitrogen is selected from one or more amino acid salts, EDTA salts, nitrilotriacetic acid salts, cyanoacetic acid salts, hippuric acid salts, o-aminobenzoic acid salts, m-aminobenzoic acid salts, p-aminobenzoic acid salts, o-aminophenylacetic acid salts, m-aminophenylacetic acid salts, p-aminophenylacetic acid salts, o-aminophenylpropionic acid salts, m-aminophenylpropionic acid salts, p-aminophenylpropionic acid salts, o-aminophenylbutyric acid salts, m-aminophenylbutyric acid salts, p-aminophenylbutyric acid salts, o-aminophenylpentoic acid salts, m-aminophenylpentoic acid salts, p-aminophenylpentoic acid salts, o-aminophenylhexylic acid salts, m-aminophenylhexylic acid salts, p-aminophenylhexylic acid salts, isonicotinic acid salts, and 2,3-pyrazine dicarboxylic acid salts.

5. The method for removing $SO_x$ from a gas according to claim 1, characterized in that, the mass percent content of the ethylene glycol and/or polyethylene glycol in the compound alcohol-amine solution is more than or equal to 50%, the mass percent content of the hydroxyl/carboxyl organic compound having basic group containing nitrogen is in the range of 0.1% to 30%, and the mass percent content of water is less than 20%.

6. The method for removing $SO_x$ from a gas according to claim 1, characterized in that, the compound alcohol-amine solution contains a certain amount of additives being organic amines, amides, sulfones, sulfoxides, organic acids, organic acid salts, and metallorganic compounds; the additives can be one or more of these substances; and the additives are present in the compound alcohol-amine solution in a mass percent content of less than 10%.

7. The method for removing $SO_x$ from a gas according to claim 1, characterized in that, the compound alcohol-amine solution absorbs the $SO_x$ in the gas under a normal or increased pressure at an absorption temperature of −20 to 80° C.

8. The method for removing $SO_x$ from a gas according to claim 1, characterized in that, the compound alcohol-amine solution with absorbed $SO_x$ is regenerated by one or more of heating method, vacuum method, gas stripping method, ultrasonic method, microwave method, and radiation method at a regeneration temperature of 0 to 300° C. to release sulfur dioxide and/or sulfur trioxide, and the regenerated compound alcohol-amine solution is recycled for use.

9. The method for removing $SO_x$ from a gas according to claim 8, further comprising:
    removing water from the compound alcohol-amine solution when a mass percent content of water in said solution is more than 20%, and
    re-using the compound alcohol-amine solution into contact with the gas containing $SO_x$ to absorb the $SO_x$ in the gas.

10. The method for removing $SO_x$ from a gas according to claim 1, characterized in that, the method is utilized to remove $SO_x$ from flue gas, waste gas containing $SO_x$ and/or industrial raw material gas.

11. The method for removing $SO_x$ from a gas according to claim 9, wherein:
    the compound alcohol-amine solution contains at least one additives selected from the group consisting of organic amines, amides, sulfones, sulfoxides, organic acids, organic acid salts, and metallorganic compounds; and
    the at least one additives are present in the compound alcohol-amine solution in a mass percent content of less than 10%.

12. The method for removing $SO_x$ from a gas according to claim 11, characterized in that, the hydroxyl organic compound having basic group containing nitrogen is selected from one or more of monomethanolamine, dimethanolamine, trimethanolamine, monoethanolamine, diethanolamine, triethanolamine, N,N-dimethyl ethanolamine, N,N-diethyl ethanolamine, N,N-diisopropyl ethanolamine, N-methyl diethanolamine, monopropanolamine, dipropanolamine, tripropanolamine, isopropanolamine, diisopropanolamine, triisopropanolamine, monobutanolamine, dibutanolamine, tributanolamine, N-hydroxyethylethylenediamine, N,N'-dihydroxyethylethylenediamine, N,N-dihydroxyethyl aniline, N-ethyl-N-hydroxyethyl aniline, N-methyl-N-hydroxyethyl aniline, o-aminophenol, m-aminophenol, p-aminophenol, 2,4,6-tri(dimethylaminomethyl)phenol, 3-diethylaminophenol, 2-amino-5-nitrophenol, aminothiaoximoacid, N-methylpyrrolidinyl alcohol, 2,4-diamino-6-hydroxy pyrimidine, cyanuric acid, 2-(2'-hydroxy-5'-methylphenyl)benzotriazole, Gamma acid, J acid, phenyl J acid, Chicago acid and its salts, H acid and its salts, di-J acid, scarlet acid and its salts.

13. The method for removing $SO_x$ from a gas according to claim 11, characterized in that, the carboxylic acid organic compound having basic group containing nitrogen is selected from one or more amino acids, EDTA, nitrilotriacetic acid, cyanoacetic acid, hippuric acid, o-aminobenzoic acid, o-aminophenylacetic acid, o-aminophenylpropionic acid, o-aminophenylbutyric acid, o-aminophenylpentoic acid, o-aminophenylhexylic acid, m-aminobenzoic acid, m-aminophenylacetic acid, m-aminophenylpropionic acid, m-aminophenylbutyric acid, m-aminophenylpentoic acid, m-aminophenylhexylic acid, p-aminobenzoic acid, p-aminophenylacetic acid, p-aminophenylpropionic acid, p-aminophenylbutyric acid, p-aminophenylpentoic acid, p-aminophenylhexylic acid, isonicotinic acid, and 2,3-pyrazine dicarboxylic acid.

14. The method for removing $SO_x$ from a gas according to claim 11, characterized in that, the carboxylate organic compound having basic group containing nitrogen is selected from one or more amino acid salts, EDTA salts, nitrilotriacetic acid salts, cyanoacetic acid salts, hippuric acid salts, o-aminobenzoic acid salts, m-aminobenzoic acid salts, p-aminobenzoic acid salts, o-aminophenylacetic acid salts, m-aminophenylacetic acid salts, p-aminophenylacetic acid salts, o-aminophenylpropionic acid salts, m-aminophenylpropionic acid salts, p-aminophenylpropionic acid salts, o-aminophenylbutyric acid salts, m-aminophenylbutyric acid salts, p-aminophenylbutyric acid salts, o-aminophenylpentoic acid salts, m-aminophenylpentoic acid salts, p-aminophenylpentoic acid salts, o-aminophenylhexylic acid salts, m-aminophenylhexylic acid salts, p-aminophenylhexylic acid salts, isonicotinic acid salts, and 2,3-pyrazine dicarboxylic acid salts.

15. The method for removing $SO_x$ from a gas according to claim 11, characterized in that, the mass percent content of the ethylene glycol and/or polyethylene glycol in the compound alcohol-amine solution is more than or equal to 50%, the mass percent content of the hydroxyl/carboxyl organic compound having basic group containing nitrogen is in the range of 0.1% to 30%, and the mass percent content of water is less than 20%.

16. The method for removing $SO_x$ from a gas according to claim 11, characterized in that, the compound alcohol-amine solution absorbs the $SO_x$ in the gas under a normal or increased pressure at an absorption temperature of −20 to 80° C.

17. The method for removing $SO_x$ from a gas according to claim 11, characterized in that, the method is utilized to remove $SO_x$ from flue gas, waste gas containing $SO_x$ and/or industrial raw material gas.

* * * * *